United States Patent
Shima

(10) Patent No.: US 12,137,224 B2
(45) Date of Patent: Nov. 5, 2024

(54) IMAGE ENCODING APPARATUS, IMAGE DECODING APPARATUS, METHODS FOR THE SAME, AND NON-TRANSITORY COMPUTER-READABLE STORAGE MEDIUM FOR SUPPRESSING THE CODE AMOUNT OF QUANTIZATION MATRICES

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 17/695,638

(22) Filed: Mar. 15, 2022

(65) Prior Publication Data

US 2022/0210421 A1 Jun. 30, 2022

Related U.S. Application Data

(63) Continuation of application No. PCT/JP2020/030904, filed on Aug. 14, 2020.

(30) Foreign Application Priority Data

Sep. 19, 2019 (JP) ................. 2019-170810

(51) Int. Cl.
*H04N 19/126* (2014.01)
*H04N 19/176* (2014.01)
(Continued)

(52) U.S. Cl.
CPC ......... *H04N 19/126* (2014.11); *H04N 19/176* (2014.11); *H04N 19/18* (2014.11); *H04N 19/186* (2014.11)

(58) Field of Classification Search
CPC .... H04N 19/126; H04N 19/176; H04N 19/18; H04N 19/186
See application file for complete search history.

(56) References Cited

U.S. PATENT DOCUMENTS

2006/0133479 A1 6/2006 Chen
2013/0251032 A1 9/2013 Tanaka
(Continued)

FOREIGN PATENT DOCUMENTS

CN 107509077 A 12/2017
EP 2728873 A2 5/2014
(Continued)

OTHER PUBLICATIONS

Yoshitaka Morigami, et al., CE4 subtest 2.1: Enhancements of HEVC quantization matrix, Joint Collaborative Team on Video Coding (JCT-VC) of ITU-T SG16 WP3 and ISO/IEC JTC1/SC29/WG11, 8th Meeting, San Jose, CA Feb. 1-10, 2012, Doc No. JCTVC-H0230.

(Continued)

*Primary Examiner* — James T Boylan
(74) *Attorney, Agent, or Firm* — Canon U.S.A., Inc. IP Division

(57) ABSTRACT

An encoding apparatus comprises a quantizer quantizing transform coefficients in a block in an image using a first quantization matrix, and an encoder encoding the first quantization matrix, wherein, for encoding the first quantization matrix, if using a first mode, the encoder encodes information indicating that the first quantization matrix is the same as a second quantization matrix having already been encoded, if using a second mode, encodes a difference between an element of the first quantization matrix and an element of the second quantization matrix, and if using a third mode, encodes a difference between an element and another element within the first quantization matrix, wherein a code amount of information representing the first mode is used is less than that of information representing that the second mode is used.

11 Claims, 19 Drawing Sheets

(51) Int. Cl.
*H04N 19/18* (2014.01)
*H04N 19/186* (2014.01)

(56) References Cited

U.S. PATENT DOCUMENTS

| | | | |
|---|---|---|---|
| 2014/0086311 A1 | 3/2014 | Lou | |
| 2015/0334396 A1* | 11/2015 | Lim | H04N 19/126 375/240.03 |
| 2017/0214934 A1 | 7/2017 | Oh | |
| 2022/0086443 A1* | 3/2022 | Lim | H04N 19/159 |
| 2022/0321885 A1* | 10/2022 | Lim | H04N 19/126 |
| 2023/0232003 A1* | 7/2023 | De Lagrange | H04N 19/126 375/240.03 |

FOREIGN PATENT DOCUMENTS

| | | |
|---|---|---|
| EP | 2806640 A1 | 11/2014 |
| EP | 3917142 A1 | 12/2021 |
| JP | 2013038758 A | 2/2013 |
| JP | 2014011482 A | 1/2014 |
| JP | 2015516754 A | 6/2015 |
| WO | 2012108237 A1 | 8/2012 |
| WO | 2014002446 A1 | 1/2014 |

OTHER PUBLICATIONS

Philippe de Lagrange, et al., Non-CE7: Quantization matrices with single identifier and prediction from larger ones, Joint Video Experts Team (JVET) of ITU-T SG 16 WP3 and ISO/IEC JTC 1/SC 29/WG 11, 15th Meeting, Gothenburg, SE, Jul. 3-12, 2019, Doc. No. JVET-O0223-v2.

Research on key algorithms of perceptual 3D video coding based on JND, China's Excellent Master's Thesis Electronic Journal, 2014.

* cited by examiner

F I G. 8A

| 6 | 10 | 13 | 16 | 18 | 23 | 25 | 27 |
|---|----|----|----|----|----|----|----|
| 10 | 11 | 16 | 18 | 23 | 25 | 27 | 29 |
| 13 | 16 | 18 | 23 | 25 | 27 | 29 | 31 |
| 16 | 18 | 23 | 25 | 27 | 29 | 31 | 33 |
| 18 | 23 | 25 | 27 | 29 | 31 | 33 | 36 |
| 23 | 25 | 27 | 29 | 31 | 33 | 36 | 38 |
| 25 | 27 | 29 | 31 | 33 | 36 | 38 | 40 |
| 27 | 29 | 31 | 33 | 36 | 38 | 40 | 42 |

~800

F I G. 8B

| 6 | 13 | 20 | 28 |
|---|----|----|----|
| 13 | 20 | 28 | 32 |
| 20 | 28 | 32 | 37 |
| 28 | 32 | 37 | 42 |

~801

F I G. 8C

| 7 | 13 | 19 | 28 |
|---|----|----|----|
| 13 | 19 | 28 | 33 |
| 19 | 28 | 33 | 37 |
| 28 | 33 | 37 | 41 |

| 9 | 13 | 15 | 17 | 19 | 21 | 22 | 24 |
|---|---|---|---|---|---|---|---|
| 13 | 13 | 17 | 19 | 21 | 22 | 24 | 25 |
| 15 | 17 | 19 | 21 | 22 | 24 | 25 | 27 |
| 17 | 19 | 21 | 22 | 24 | 25 | 27 | 28 |
| 19 | 21 | 22 | 24 | 25 | 27 | 28 | 30 |
| 21 | 22 | 24 | 25 | 27 | 28 | 30 | 32 |
| 22 | 24 | 25 | 27 | 28 | 30 | 32 | 33 |
| 24 | 25 | 27 | 28 | 30 | 32 | 33 | 35 |

| 10 | 14 | 20 | 24 |
|---|---|---|---|
| 14 | 20 | 24 | 27 |
| 20 | 24 | 27 | 30 |
| 24 | 27 | 30 | 34 |

| 8 | 14 | 19 | 24 |
|---|---|---|---|
| 14 | 19 | 24 | 27 |
| 19 | 24 | 27 | 31 |
| 24 | 27 | 31 | 35 |

~805

F I G. 8G

| 6 | 13 | 20 | 28 |
|---|----|----|----|
| 13 | 20 | 28 | 32 |
| 20 | 28 | 32 | 37 |
| 28 | 32 | 37 | 42 |

~806

F I G. 8H

| 6 | 20 |
|---|----|
| 20 | 32 |

~807

F I G. 8I

| 6 | 20 |
|---|----|
| 20 | 33 |

| 10 | 14 | 20 | 24 |
|----|----|----|----|
| 14 | 20 | 24 | 27 |
| 20 | 24 | 27 | 30 |
| 24 | 27 | 30 | 34 |

| 10 | 20 |
|----|----|
| 20 | 27 |

| 10 | 20 |
|----|----|
| 20 | 28 |

|   |   |   |   |
|---|---|---|---|
| 1 | 0 | 1 | 0 |
| 0 | 1 | 0 | 1 |
| 1 | 0 | 1 | 0 |
| 0 | 1 | 0 | -1 |

| 1 | 0 | 0 | 1 | 1 | 1 | 0 | 0 | 0 | 0 | 1 | 1 | 1 | 0 | 0 | -1 |

| -2 | 7 | 0 | 7 | 0 | 0 | 8 | 0 | 0 | 0 | 4 | 0 | 0 | 5 | 0 | 5 |

FIG. 11A

| ENCODING TARGET VALUE | BINARY CODE |
|---|---|
| ... | ... |
| -5 | 0001011 |
| -4 | 0001001 |
| -3 | 00111 |
| -2 | 00101 |
| -1 | 011 |
| 0 | 1 |
| 1 | 010 |
| 2 | 00100 |
| 3 | 00110 |
| 4 | 0001000 |
| 5 | 0001010 |
| ... | ... |

FIG. 11B

| ENCODING TARGET VALUE | BINARY CODE |
|---|---|
| ... | ... |
| -5 | 0001011 |
| -4 | 0001001 |
| -3 | 00111 |
| -2 | 0010 |
| -1 | 011 |
| 0 | 11 |
| 1 | 10 |
| 2 | 010 |
| 3 | 00110 |
| 4 | 0001000 |
| 5 | 0001010 |
| ... | ... |

F I G. 12

| scaling_list_data( ) { | Descriptor |
|---|---|
|    for( sizeId = 1; sizeId < 4; sizeId++ ) | |
|       for( matrixId = 0; matrixId < 6; matrixId ++ ) { | |
|          if( ! ( ( ( sizeId = = 1 ) && ( matrixId % 3 = = 0 ) ) \|\| | |
|          ( ( sizeId = = 3 ) && ( matrixId % 3 != 0 ) ) ) ) { | |
|             scaling_list_pred_mode_idx[ sizeId ][ matrixId ] | u(1) |
|             if( scaling_list_pred_mode_idx[ sizeId ][ matrixId ] < 2 ) { | |
|                scaling_list_pred_matrix_id_delta[ sizeId ][ matrixId ] | ue(v) |
|                if( scaling_list_pred_mode_idx[ sizeId ][ matrixId ] == 1 ) { | |
|                   refMatrixId = matrixId – scaling_list_pred_matrix_id_delta - 1 | |
|                   coefNum = ( 1 << ( sizeId << 1 ) ) | |
|                   for( i = 0; i < coefNum; i++ ) { | |
|                      nextCoef = ScalingList[ sizeId ][ refMatrixId ][ i ] | |
|                      scaling_list_pred_delta | se(v) |
|                      nextCoef = ( nextCoef + scaling_list_pred_delta + 256 ) % 256 | |
|                      ScalingList[ sizeId ][ matrixId ][ i ] = nextCoef | |
|                   } | |
|             } else { | |
|                nextCoef = 8 | |
|                coefNum = ( 1 << ( sizeId << 1 ) ) | |
|                for( i = 0; i < coefNum; i++ ) { | |
|                   scaling_list_delta_coef | se(v) |
|                   nextCoef = ( nextCoef + scaling_list_delta_coef + 256 ) % 256 | |
|                   ScalingList[ sizeId ][ matrixId ][ i ] = nextCoef | |
|                } | |
|             } | |
|          } | |
|         } | |
|       } | |
| } | |

FIG. 13A

| 16 | 16 | 16 | 16 | 16 | 16 | 16 | 16 | ～1300 |
|----|----|----|----|----|----|----|----|----|
| 16 | 16 | 16 | 16 | 16 | 16 | 16 | 16 | |
| 16 | 16 | 16 | 16 | 16 | 16 | 16 | 16 | |
| 16 | 16 | 16 | 16 | 16 | 16 | 16 | 16 | |
| 16 | 16 | 16 | 16 | 16 | 16 | 16 | 16 | |
| 16 | 16 | 16 | 16 | 16 | 16 | 16 | 16 | |
| 16 | 16 | 16 | 16 | 16 | 16 | 16 | 16 | |
| 16 | 16 | 16 | 16 | 16 | 16 | 16 | 16 | |

FIG. 13B

| 16 | 16 | 16 | 16 |
|----|----|----|----|
| 16 | 16 | 16 | 16 |
| 16 | 16 | 16 | 16 |
| 16 | 16 | 16 | 16 |

| 16 | 16 |
|----|----|
| 16 | 16 |

～1302

IMAGE ENCODING APPARATUS, IMAGE DECODING APPARATUS, METHODS FOR THE SAME, AND NON-TRANSITORY COMPUTER-READABLE STORAGE MEDIUM FOR SUPPRESSING THE CODE AMOUNT OF QUANTIZATION MATRICES

CROSS-REFERENCE TO RELATED APPLICATIONS

This application is a Continuation of International Patent Application No. PCT/JP2020/030904, filed Aug. 14, 2020, which claims the benefit of Japanese Patent Application No. 2019-170810, filed Sep. 19, 2019, both of which are hereby incorporated by reference herein in their entirety.

BACKGROUND OF THE INVENTION

Field of the Invention

The present invention relates to an image coding apparatus, an image decoding apparatus, methods for the same, and a non-transitory computer-readable storage medium.

Background Art

Known encoding methods for compressing and recording moving images include the HEVC (High Efficiency Video Coding) encoding method (hereinafter, simply referred to as HEVC). In order to improve encoding efficiency, HEVC employs basic blocks that are larger than conventional macroblocks (16×16 pixels). These large base blocks are called CTUs (Coding Tree Units), and are up to 64×64 pixels in size. CTUs are further divided into subblocks that serve as units for performing prediction and transformation.

Also, HEVC uses processing in which coefficients that have undergone orthogonal transformation (hereinafter, referred to as orthogonal transform coefficients), called quantization matrices, are weighted according to the frequency component. By further reducing data of the high frequency component whose deterioration is not readily visible to the human eye, it is possible to enhance compression efficiency while maintaining image quality. Patent Document 1 discloses a technology for encoding such quantization matrices.

In recent years, activities for carrying out international standardization of more efficient encoding methods as successors to HEVC have commenced. JVET (Joint Video Experts Team) was established between ISO/IEC and ITU-T, and standardization as the VVC (Versatile Video Coding) encoding method (hereinafter, VVC) is ongoing. In order to improve encoding efficiency, the basic blocks in VVC are up to 128×128 pixels in size, and rectangular subblock division is also being considered in addition to conventional square subblock division.

The introduction of quantization matrices to VVC similarly to HEVC is also been considered. Furthermore, with VVC, more types of subblock division than HEVC, including rectangular subblocks, are being considered. Since the distribution of orthogonal transform coefficients corresponding to each subblock division differs depending on the size and shape of the orthogonal transformation, it is desirable to define the optimal quantization matrix according to the size and shape of the subblocks. However, if individual quantization matrices are defined for all subblock shapes, the code amount of the quantization matrices will increase unnecessarily.

CITATION LIST

Patent Literature

PTL 1: Japanese Patent Laid-open No. 2013-38758

SUMMARY OF THE INVENTION

The present invention made been made in view of such problems, and provides a technology for suppressing the code amount of quantization matrices.

In order to solve this problem, an image encoding apparatus of the present invention is provided with the following configuration, for example. That is, the image encoding apparatus comprises a quantization unit configured to quantize transform coefficients in a block in an image, using a first quantization matrix; and an encoding unit configured to encode the first quantization matrix, wherein (a) in a case where a first mode is used to encode the first quantization matrix, the encoding unit encodes information indicating that the first quantization matrix is the same as a second quantization matrix which has already been encoded prior to encoding of the first quantization matrix, (b) in a case where a second mode is used to encode the first quantization matrix, the encoding unit encodes a difference between an element of the first quantization matrix and an element of the second quantization matrix, and (c) in a case where a third mode is used to encode the first quantization matrix, the encoding unit encodes a difference between an element and another element within the first quantization matrix, wherein a code amount of information representing the first mode is used is less than a code amount of information representing that the second mode is used.

Further features of the present invention will become apparent from the following description of exemplary embodiments with reference to the attached drawings.

BRIEF DESCRIPTION OF THE DRAWINGS

FIG. 8A is a diagram showing an example of a quantization matrix used in the embodiments.

FIG. 8B is a diagram showing an example of a quantization matrix used in the embodiments.

FIG. 8C is a diagram showing an example of a quantization matrix used in the embodiments.

FIG. 8D is a diagram showing an example of a quantization matrix used in the embodiments.

FIG. 8E is a diagram showing an example of a quantization matrix used in the embodiments.

FIG. 8F is a diagram showing an example of a quantization matrix used in the embodiments.

FIG. 8G is a diagram showing an example of a quantization matrix used in the embodiments.

FIG. 8H is a diagram showing an example of a quantization matrix used in the embodiments.

FIG. 8I is a diagram showing an example of a quantization matrix used in the embodiments.

FIG. 8J is a diagram showing an example of a quantization matrix used in the embodiments.

FIG. 8K is a diagram showing an example of a quantization matrix used in the embodiments.

FIG. 8L is a diagram showing an example of a quantization matrix used in the embodiments.

FIG. 10A is a diagram showing a diagram showing a difference value matrix of a quantization matrix generated in the embodiments.

FIG. 10B is a diagram showing a diagram showing a difference value matrix of a quantization matrix generated in the embodiments.

FIG. 10C is a diagram showing a diagram showing a difference value matrix of a quantization matrix generated in the embodiments.

FIG. 11A is a diagram showing an example of an encoding table used to encode difference values of a quantization matrix.

FIG. 11B is a diagram showing an example of an encoding table used to encode difference values of a quantization matrix.

FIG. 12 is a diagram showing an example of a syntax table for quantization matrices that is used in the embodiments.

FIG. 13A is a diagram showing an example of a reference quantization matrix that is used in the embodiments.

FIG. 13B is a diagram showing an example of a reference quantization matrix that is used in the embodiments.

FIG. 13C is a diagram showing an example of a reference quantization matrix that is used in the embodiments.

DESCRIPTION OF THE EMBODIMENTS

Figure 1:
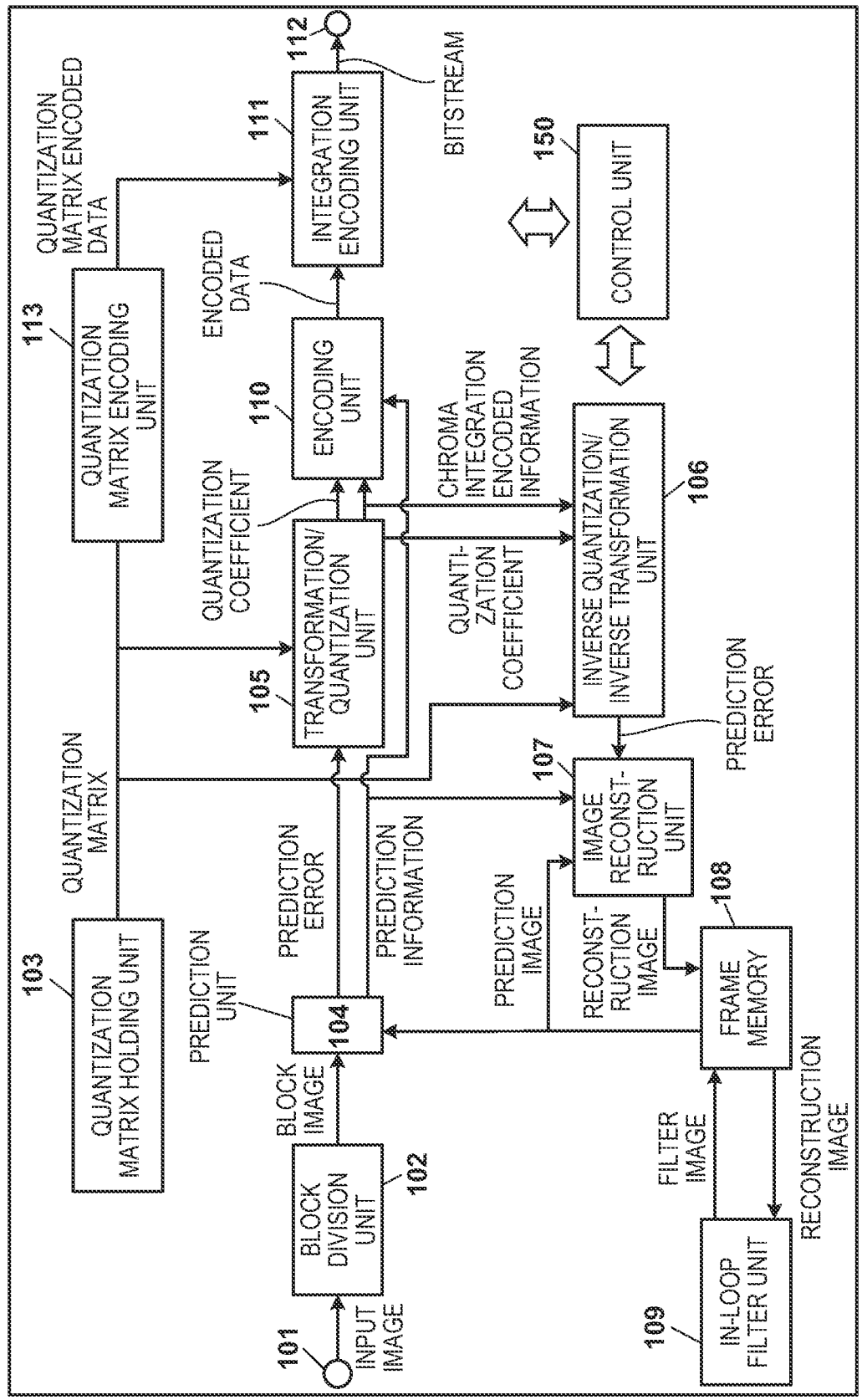
FIG. 1 is a block configuration diagram of an image encoding apparatus of a first embodiment.

Hereinafter, embodiments will be described in detail with reference to the accompanying drawings. Note that the following embodiments do not limit the invention according to the patent claims. The embodiments describe a plurality of features, but not all of these features are essential to the invention, and the features may be discretionarily combined. Furthermore, constituent elements that are the same or similar are given the same reference numerals in the accompanying drawings, and redundant description thereof will be omitted.

First Embodiment

The embodiments describe a plurality of features, but not all of these features are essential to the invention, and the features may be discretionarily combined. Furthermore, in the accompanying drawings, constituent elements that are the same or similar are given the same reference numerals, and redundant description thereof will be omitted.

FIG. 1 is a block configuration diagram of an image encoding apparatus of a first embodiment. The image encoding apparatus has a control unit 150 that administers overall control of the apparatus. This control unit 150 has a CPU, a ROM for storing programs executed by the CPU, and a RAM that is utilized as a work area of the CPU. The image encoding apparatus has an input terminal 101, a block division unit 102, a quantization matrix holding unit 103, a prediction unit 104, a transformation/quantization unit 105, an inverse quantization/inverse transformation unit 106, an image reconstruction unit 107, a frame memory 108, an in-loop filter unit 109, an encoding unit 110, an integration encoding unit 111, an output terminal 112, and a quantization matrix encoding unit 113.

The input terminal 101 inputs, in units of frames, image data for encoding generated by an image data source. The image data source is not limited in terms of type, being an image capturing apparatus, file server or storage medium storing image data for encoding or the like. The output terminal 112 outputs encoded data to an output destination device, and the output destination device is also not particularly limited, being a storage medium, file server or the like.

The block division unit 102 divides the images of input frames into a plurality of basic blocks, and outputs one basic block of each frame in order to the downstream prediction unit 104.

The quantization matrix holding unit 103 generates a plurality of quantization matrices prior to encoding and holds the generated quantization matrices in an internal memory not shown. The method for generating quantization matrices is not particularly limited, and may involve quantization matrices being input by a user or computed from the characteristics of input images, or quantization matrices designated in advance as initial values being used. The quantization matrix holding unit 103 in the present embodiment generates and holds 8×8, 4×4 and 2×2 pixel-sized two-dimensional quantization matrices 800 to 811 compatible with orthogonal transformation an shown in FIGS. 8A to 8L. Here, quantization matrices 800, 803, 806 and 809 are quantization matrices for a luma component, and quantization matrices 801, 802, 804, 805, 807, 808, 810 and 811 are quantization matrices for two chroma components.

The prediction unit 104 determines subblock division for image data in basic block units, performs processing such as intra-prediction which is prediction within frames in subblock units and inter-prediction which is prediction between frames, and generates prediction image data. Furthermore, the prediction unit 104 computes and outputs prediction errors in pixel units from subblocks in the input image data and corresponding prediction image data. Also, the prediction unit 104 outputs information required in prediction, such as subblock division, prediction mode and motion vectors, together with the prediction errors. Henceforth, this information required in prediction will be referred to as prediction information.

The transformation/quantization unit 105 obtains orthogonal transform coefficients by performing, in subblock units, orthogonal transformation of prediction errors of the subblocks input from the prediction unit 104. Furthermore, the transformation/quantization unit 105 performs quantization of the orthogonal transform coefficients using the quantization matrices stored in the quantization matrix holding unit 103, and obtains residual coefficients (quantized orthogonal transform coefficients).

The inverse quantization/inverse transformation unit 106 inputs the residual coefficients from the transformation/quantization unit 105, performs inverse quantization using the corresponding quantization matrices stored in the quantization matrix holding unit 103, and reconstructs the orthogonal transform coefficients. The inverse quantization/inverse transformation unit 106 further performs inverse orthogonal transformation on the orthogonal transform coefficients to reconstruct the prediction errors.

The image reconstruction unit 107 generates prediction image data by referring to the frame memory 108 as appropriate, based on the prediction information output from the prediction unit 104. The image reconstruction unit 107 generates reconstruction image data by adding the prediction errors input from the inverse quantization/inverse transformation unit 106 to the generated prediction image data, and stores the generated reconstruction image data in the frame memory 108.

The in-loop filter 109 performs in-loop filtering such as deblocking filtering and sample adaptive offsetting on the reconstruction image stored in the frame memory 108, and again stores the filtered image data in the frame memory 108.

The encoding unit 110 encodes the residual coefficients output from the transformation/quantization unit 105 and the prediction information output from the prediction unit 104 to generate encoded data, and outputs the encoded data to the integration encoding unit 111.

The quantization matrix encoding unit 113 encodes the quantization matrices (see FIGS. 8A to 8L) held in the quantization matrix holding unit 103, generates quantization matrix encoded data, and outputs the quantization matrix encoded data to the integration encoding unit 111.

The integration encoding unit 111 generates header encoded data including the quantization matrix encoded data output from the quantization matrix encoding unit 113. The integration encoding unit 111 then positions the encoded data output from the encoding unit 110 to follow the header encoded data and forms a bitstream. The integration encoding unit 111 then outputs the formed bitstream via the output terminal 112.

Here, the image encoding operation in the image encoding apparatus will be described below in more detail. In the present embodiment, a configuration is adopted in which moving image data having a 4:2:0 color format is input from the input terminal 101 in frame units at a predetermined frame rate (e.g., 30 frames/second), but a configuration may also be adopted in which still image data is input at one frame/minute. Also, in the present embodiment, for descriptive purposes, the block division unit 101 will be described as dividing the image data input from the input terminal 101 into a basic block of 8×8 pixels. That is, a basic block of 8×8 pixels includes a luma (Y) component of 8×8 pixels and chroma (Cb and Cr) components of 4×4 pixels. Note that this is to facilitate understanding, and the invention is not limited to the above numerical values (sizes).

Prior to encoding an image, generation and encoding of quantization matrices is performed.

The quantization matrix holding unit 103, first, generates and holds quantization matrices. Specifically, the quantization matrix holding unit 103 generates quantization matrices, according to the size of the subblocks to be encoded and the type of prediction method. In the present embodiment, the quantization matrix holding unit 103 generates a quantization matrix corresponding to an 8×8 pixel base block that has is not been divided into subblocks shown in FIG. 7A and a quantization matrix corresponding to 4×4 pixel subblocks obtained by performing quad-tree division on the basic block shown in FIG. 7B. That is, the quantization matrix holding unit 103 generates 8×8 and 4×4 pixel-sized quantization matrices for the luma (Y) component, and 4×4 and 2×2 pixel-sized quantization matrix for the chroma (Cb and Cr) components. The quantization matrices that are generated are, however, not limited thereto, and quantization matrices corresponding to the shape of the subblocks such as 4×8 and 8×4 may be generated. The method of determining the elements constituting the quantization matrices is not particularly limited. For example, a predetermined initial value may be used, or the elements may be set individually. Also, the quantization matrices may be generated according to the characteristics of the images.

The quantization matrix holding unit 103 holds a plurality of types of quantization matrices generated in this way in an internal memory not shown. FIG. 8A shows an 8×8 pixel-sized quantization matrix 800 for the Y component that uses intra-prediction. Also, FIG. 8B shows a 4×4-pixel-sized quantization matrix 801 for the Cb component that likewise uses intra-prediction, and FIG. 8C shows a 4×4-pixel-sized quantization matrix 802 for the Cr component that uses intra-prediction.

Similarly, FIG. 8D shows an 8×8 pixel-sized quantization matrix 803 for the Y component that uses inter-prediction. Also, FIG. 8E also shows a 4×4-pixel-sized quantization matrix 804 for the Cb component that uses inter-prediction, and FIG. 8F shows a 4×4-pixel-sized quantization matrix 805 for the Cr component that uses inter-prediction.

Furthermore, FIG. 8G shows a 4×4 pixel-sized quantization matrix 806 for the Y component that uses intra-prediction. Also, FIG. 8H also shows a 2×2-pixel-sized quantization matrix 807 for the Cb component that uses intra-prediction, and FIG. 8I shows a 2×2-pixel-sized quantization matrix 808 for the Cr component that uses intra-prediction.

Similarly, FIG. 8J shows a 4×4 pixel-sized quantization matrix 809 for the Y component that uses inter-prediction. FIG. 8K also shows a 2×2-pixel-sized quantization matrix 810 for the Cb component that uses inter-prediction, and FIG. 8L shows a 2×2-pixel-sized quantization matrix 811 for the Cr component that uses inter-prediction.

In order to simplify description, configurations of 64 pixels (8×8), 16 pixels (4×4) and 4 pixels (2×2) are given, and each thick-framed square represents the elements constituting a quantization matrix. In the present embodiment, the 12 types of quantization matrices shown in FIGS. 8A to 8L are held in two-dimensional form, but the respective elements within the quantization matrices are naturally not limited thereto. Also, depending on the size of the subblocks, it is also possible to hold a plurality of quantization matrices for the same color component and the same prediction mode. Generally, since the quantization matrices realize quantization processing that depends on human visual characteristics, the elements of the low frequency component corresponding to the upper left portion of the quantization matrices are smaller, and the elements of the high frequency component corresponding to the lower right portion are larger, as shown in FIGS. 8A to 8L.

The quantization matrix encoding unit 113 reads out the two-dimensional quantization matrices held in the quantization matrix holding unit 106 in order, and determines the encoding mode of each quantization matrix to be used when encoding the quantization matrix. In the present embodiment, three types of quantization matrix encoding modes are used, namely, a "quantization matrix reference mode", an "inter-quantization matrix difference encoding mode", and an "intra-quantization matrix difference encoding mode". The quantization matrix encoding unit 113 determines, for each quantization matrix, a quantization matrix encoding mode that minimizes the data amount of the encoding result.

Here, the three types of quantization matrix encoding modes that are used by the quantization matrix encoding unit 113 of the present embodiment will be described in more detail.

The "quantization matrix reference mode" is a mode that is used when there is an encoded quantization matrix that matches the quantization matrix to be encoded. When this mode is used, the quantization matrix encoding unit 113 encodes a quantization matrix reference index, which is an identifier indicating the encoded quantization matrix matching the quantization matrix to be encoded, instead of encoding the elements of the quantization matrix to be encoded.

Next, the "inter-quantization matrix difference encoding mode" is a mode in which an encoded quantization matrix that approximates the quantization matrix to be encoded is selected, a difference value of each of the elements is computed, and the computed difference values are encoded. When this mode is selected, the quantization matrix encoding unit 113 encodes a quantization matrix reference index, which is an identifier indicating the quantization matrix to be referenced, and then encodes difference information which is a set of difference values of the respective elements.

Also, the "intra-quantization matrix difference encoding mode" is used when there are no encoded quantization matrices or when there are no encoded quantization matrices similar to the quantization matrix to be encoded. The quantization matrix encoding unit scans each element of the quantization matrix to be encoded, calculates the difference values between the elements, and encodes difference information which is a set of difference values.

FIG. 12 is a syntax table that is used in encoding the quantization matrix in the present embodiment. The encoding processing of the quantization matrices shown in FIGS. 8A to 8L of the present embodiment will be specifically described using this syntax table. First, the structure of the syntax table in FIG. 12 will be described. On the outermost side of the syntax table is a "for" loop for a parameter "sizeId". sizeId indicates the size of the quantization matrix, and quantization matrices of the same size are encoded in succession. sizeId=1 indicates a 2×2 pixel-sized quantization matrix. Similarly, sizeId=2 indicates a 4×4 pixel-sized quantization matrix, and sizeId=3 indicates an 8×8 pixel-sized quantization matrix.

The initial value of the sizeId in the for loop is "1", and defines that the value will be incremented by "1" every loop and the loop will be repeated as long as sizeId is less than 4. Therefore, in the present embodiment, this means that after the group of 2×2 pixel-sized quantization matrixes is encoded, the group of the 4×4 pixel-sized quantization matrices will be encoded, followed by the group of 8×8 pixel-sized quantization matrices. In VVC, orthogonal transformation from a minimum 2×2 pixel size to a 64×64 pixel size is used, and it is also possible to adopt a configuration in which for loops from a 2×2 pixel size whose sizeId is 1 to a 64×64 pixel size whose sizeId is 6 are set, and quantization matrices respectively corresponding thereto are encoded. However, in the present embodiment, the maximum orthogonal transformation size, that is, the maximum size of the subblocks is 8×8, and thus the upper limit value of a for loop is a sizeId of 3 corresponding to the 8×8 pixel size. This enables unnecessary quantization matrix encoding to be omitted and redundant code generation to be prevented, by setting the upper limit value of the for loop based on the maximum value of the orthogonal transformation size that is actually used.

Inside the for loop for sizeId, there is a for loop for a parameter matrixId. This matrixId is a parameter based on the prediction mode and color component, and a value of 0 means intra-prediction/Y component, 1 means intra-prediction/Cb component, and 2 means intra-prediction/Cr component. Similarly, a matrixId of 3 means inter-prediction/Y component, 4 means inter-prediction/Cb component, and 5 means inter-prediction/Cr component. That is, in a group of quantization matrices of the same size, the quantization matrices corresponding to intra-prediction are encoded first, and then the quantization matrices corresponding to inter-prediction are encoded. Furthermore, in a group of quantization matrices corresponding to the same prediction mode, the quantization matrices are encoded in the order Y component, Cb component, Cr component.

Taking the above encoding order of quantization matrices into consideration, the encoding order of the quantization matrices of FIGS. 8A to 8L is as follows.

First, the 2×2 pixel-sized quantization matrices of FIGS. 8H, 8I, 8K and 8L are encoded. Next, the 4×4 pixel-sized quantization matrices of FIGS. 8G, 8B, 8C, 8J, 8E and 8F are encoded. Finally, the 8×8 pixel-sized quantization matrices of FIGS. 8A and 8D are encoded.

In short, the above order of encoding involves encoding the quantization matrices in order of priority: (i) quantization matrix size, (ii) intra/inter type, and (iii) component (luma, chroma) type. Quantization matrix size is first in order of priority because encoding is performed with consideration for the correlation between quantization matrices.

Next, the procedure for encoding each quantization matrix will be described. First, the quantization matrix encoding unit 113 encodes the determined quantization matrix encoding mode. In the syntax table in FIG. 12, scaling_list_pred_mode_idx corresponds to the quantization matrix encoding mode. In the present embodiment, the "quantization matrix reference mode" is used when the value thereof is 0, the "inter-quantization matrix difference encoding mode" is used when the value is 1, and the "intra-quantization matrix difference encoding mode" is used when the value is 2. Since the quantization matrix encoding mode is Golomb encoded, the code amount related to scaling_list_pred_mode_idx is smaller as this value decreases. That is, in the present embodiment, the code amount related to the matrix reference mode is the smallest, which is advantageous in that the code amount that arises is minimized when there is a large number of quantization matrices that are the same.

When using the quantization matrix reference mode, the quantization matrix encoding unit 113 encodes the quantization matrix reference index next. This corresponds to scaling_list_pred_matrix_id_delta in the syntax table in FIG. 12. For example, the quantization matrix 801 in FIG.

8B is the same as the quantization matrix 806 in FIG. 8G encoded most recently. Therefore, at the time of encoding the quantization matrix 801 in FIG. 8B, the quantization matrix encoding unit 113 selects the quantization matrix reference mode, and encodes 0 indicating that the quantization matrix 801 is the quantization matrix encoded most recently as the quantization matrix reference index. This enables quantization matrices that are the same as the quantization matrix 806 in FIG. 8G to be encoded. Note that when the quantization matrix encoded second most recently is used, the quantization matrix reference index will be "1".

Figure 9A:
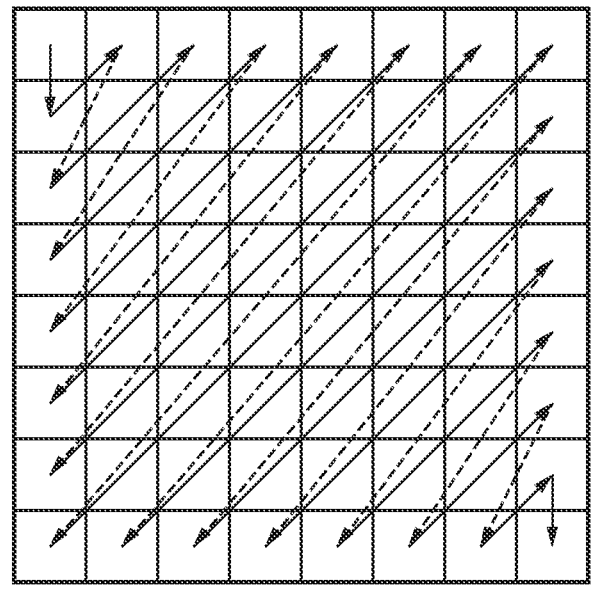
FIG. 9A is a diagram showing a diagram showing a method for scanning elements of a quantization matrix used in the embodiments.
Figure 9B:
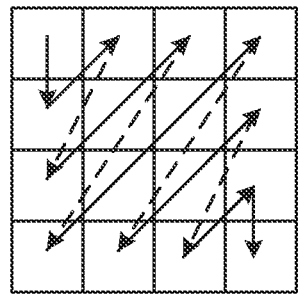
FIG. 9B is a diagram showing a diagram showing a method for scanning elements of a quantization matrix used in the embodiments.
Figure 9C:
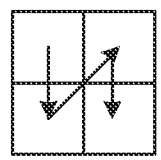
FIG. 9C is a diagram showing a diagram showing a method for scanning elements of a quantization matrix used in the embodiments.

On the other hand, when using the inter-quantization matrix difference encoding mode, the quantization matrix encoding unit 113 first encodes the quantization matrix reference index, similarly to when using the quantization matrix reference mode. Subsequently, the quantization matrix encoding unit 113 encodes difference information which is the difference between each element of the encoded reference quantization matrix defined by the quantization matrix reference index and the corresponding element of the quantization matrix to be encoded. This corresponds to scaling_list_pred_delta in the syntax table in FIG. 12. For example, each element of the quantization matrix 802 in FIG. 8C is similar to the corresponding element of the quantization matrix 801 in FIG. 8B encoded most recently (in this example, the absolute value of the difference between corresponding elements is less than or equal to a predetermined value ("1" or less is illustrated). Therefore, at the time of encoding the quantization matrix 802, the quantization matrix encoding unit 113 in FIG. 8C selects the inter-quantization matrix difference encoding mode, and, first, encodes 0 indicating that the quantization matrix 802 is the quantization matrix encoded most recently as the quantization matrix reference index. Note that when encoding the difference from each element of the quantization matrix encoded second most recently, the quantization matrix reference index will be "1". Subsequently, the quantization matrix encoding unit 113 calculates the difference value between each element in FIG. 8B, which is a reference quantization matrix, and the corresponding element of FIG. 8C, which is the quantization matrix to be encoded, and computes a two-dimensional difference value matrix 1000 shown in FIG. 10A. The quantization matrix encoding unit 113 then scans each difference value of the two-dimensional difference value matrix 1000 and arranges the difference values in a one-dimensional matrix. FIGS. 9A to 9C show the scanning method that is used in the present embodiment when a two-dimensional matrix in arranged one dimensionally, with FIGS. 9A, 9B and 9C respectively corresponding to 8×8, 4×4 and 2×2 quantization matrices. Since the 4×4 quantization matrix is targeted here, the quantization matrix encoding unit 113 arranges the two-dimensional difference value matrix 1000 in FIG. 10A in a one-dimensional difference value matrix 1001 shown in FIG. 10B, using the scanning method shown in FIG. 9B. The quantization matrix encoding unit 113 then encodes each difference value of the matrix 1001 in FIG. 10B. Note that the absolute value of each difference value in FIG. 10B is "1" or less, but there may be cases where the absolute value is greater than 1. By further acquiring the difference between adjacent difference values in consideration of such a case, it is possible to further reduce the code amount.

Also, when using the intra-quantization matrix difference encoding mode, the quantization matrix encoding unit 113 scans each element of the quantization matrix to be encoded, using one of FIGS. 9A to 9C, calculates the difference between two consecutive elements, and arranges the differences in a one-dimensional matrix. The quantization matrix encoding unit 113 then encodes each difference value arranged in the one-dimensional matrix as difference information. This corresponds to scaling_list_delta_coef in the syntax table in FIG. 12. For example, since the quantization matrix 806 in FIG. 8G is the first of the 4×4 pixel-sized quantization matrices to be encoded, there is no quantization matrix to reference using the aforementioned quantization matrix reference mode or inter-quantization matrix difference encoding mode. Therefore, at the time of encoding the quantization matrix 806 in FIG. 8G, the quantization matrix encoding unit 113 necessarily selects the intra-quantization matrix difference encoding mode. Therefore, the quantization matrix encoding unit 113 scans the quantization matrix 806 in FIG. 8G using FIG. 9B, and computes, for every element, the difference from the immediately previous element in scanning order. The quantization matrix encoding unit 113 arranges the calculated differences in a one-dimensional matrix and obtains a one-dimensional difference value matrix 1002 shown in FIG. 10C. Here, for example, the 4×4 pixel-sized quantization matrix in FIG. 8G is scanned by the scanning method shown in FIG. 9B, whereby an element 13 located immediately below the first element 6 located in the upper left is scanned, and +7 which is the difference is computed. Also, in encoding the first element of the quantization matrix (6 in the present embodiment), it is assumed that the difference from a predetermined initial value (e.g., 8) is calculated, but the present invention is naturally not limited thereto, and the difference from any value or the value of the first element itself may be used. The initial value need only be the same as the decoding apparatus. The quantization matrix encoding unit 113 then encodes each difference value in FIG. 10C.

Here, the above processing for encoding the quantization matrices will be further described. The fifth "scaling_list_pred_mode_idx[sizeId][matrixId]" from the top in FIG. 12 is a parameter indicating the encoding mode of quantization matrices that depends on sizeId and matrixId. In computing this parameter, a quantization matrix (one of FIGS. 8A to 8L) specified by sizeId and matrixId is encoded in accordance with the above three encoding modes, and the encoding mode that minimizes the generated encoding is determined. Information (0 to 2 described above) specifying the determined encoding mode is then set as a parameter thereof.

The quantization matrix encoding unit 113 generates quantization matrix encoded data as an encoding result of each quantization matrix generated using the quantization matrix encoding modes in the manner described above. The quantization matrix encoding unit 113 of the present embodiment encodes the individual elements of a one-dimensional difference value matrix using the encoding table shown in FIG. 11A by allocating a code word which is a binary code, and generates quantization matrix encoded data. Note that the encoding table is not limited thereto, and an encoding table shown in FIG. 11B, for example, may be used. In this way, the quantization matrix encoding unit 113 outputs the generated quantization matrix encoded data to the downstream integration encoding unit 111.

Returning to FIG. 1, the integration encoding unit 111 integrates the quantization matrix encoded data into header information required in encoding the image data.

Subsequently, encoding of the image data is performed. Image data of one frame input from the input terminal 101 is supplied to the block division unit 102.

The block division unit 102 divides the input image data of one frame into a plurality of basic blocks, and outputs image data in basic block units to the prediction unit 104. In the present embodiment, image data in basic block units of 8×8 pixels will be supplied to the prediction unit 104.

The prediction unit 104 executes prediction processing on the image data in basic block units input from the block division unit 102. Specifically, the prediction unit 104 determines the subblock division for dividing the basic blocks into smaller subblocks, and further determines the prediction mode such as intra-prediction or inter-prediction in subblock units. Intra-prediction involves generating prediction pixels of the block to be encoded using encoded pixels located spatially around the block to be encoded, and also generating an intra-prediction mode indicating an intra-prediction method such as horizontal prediction, vertical prediction or DC prediction. Inter-prediction involves generating prediction pixels of the block to be encoded using encoded pixels of a frame that differs temporally from the block to be encoded, and also generating motion information indicating a reference frame, a motion vector or the like.

Subblock division methods will be described with reference to FIGS. 7A to 7F. The thick frames of blocks 700 to 705 in FIGS. 7A to 7F are the same 8×8 pixel size as the basic blocks. Each rectangle within the thick frame represents a subblock. FIG. 7B represents an example of conventional square subblock division, with an 8×8 pixel basic block 701 being divided into four 484-pixel subblocks. On the other hand, FIGS. 7C to 7F represent an example of rectangular subblock division. FIG. 7C shows that a basic block 702 is divided into two 4×8 pixel-sized subblocks (long vertically). FIG. 7D shows that a basic block 703 is divided into two 8×4 pixel-sized subblocks (long horizontally). FIGS. 7E and 7F show basic blocks 704 and 705 divided into three rectangular subblocks by a ratio of 1:2:1, although the division methods differ therebetween. In this way, encoding is performed using not only squares but also rectangular subblocks.

Figure 7A:
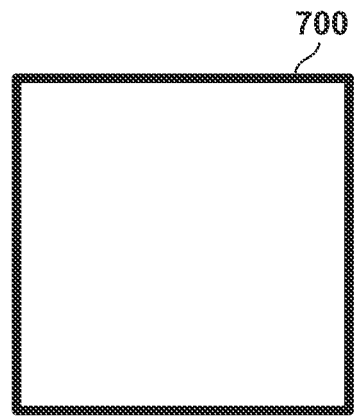
FIG. 7A is a diagram showing an example subblock division in the embodiments.
Figure 7B:
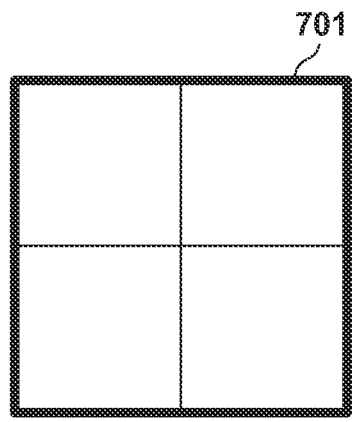
FIG. 7B is a diagram showing an example subblock division in the embodiments.
Figure 7C:
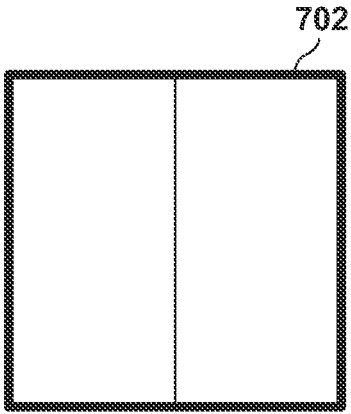
FIG. 7C is a diagram showing an example subblock division in the embodiments.
Figure 7D:
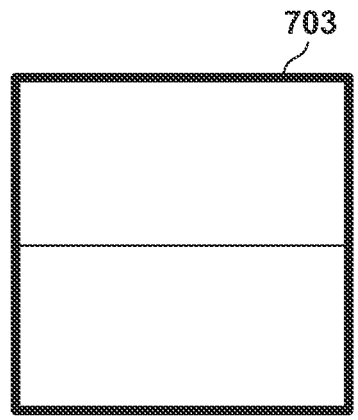
FIG. 7D is a diagram showing an example subblock division in the embodiments.
Figure 7E:
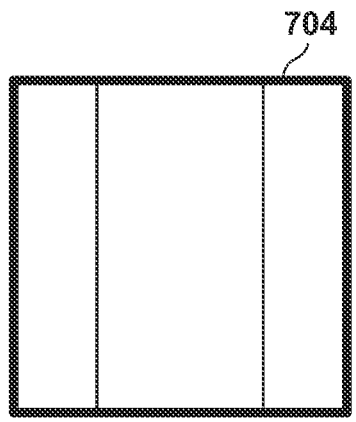
FIG. 7E is a diagram showing an example subblock division in the embodiments
Figure 7F:
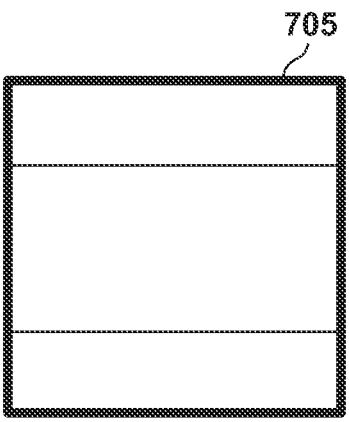
FIG. 7F is a diagram showing an example subblock division in the embodiments.

The present embodiment is described in terms of one of FIG. 7A in which the 8×8 pixel-sized basic block is not divided into subblocks and FIG. 7B in which the basic block is divided in four being used, but the subblock division method is not limited thereto. Tri-tree division such as FIGS. 7E and 7F or bi-tree division such as is shown in FIGS. 7C and 7D may be used. When subblock division other than FIGS. 7A and 7B are also used, quantization matrices corresponding to the subblocks that are used are generated in the quantization matrix holding unit 103. Also, the generated quantization matrices will be encoded by the quantization matrix encoding unit 113.

The prediction unit 104 generates prediction image data from the determined prediction mode and an encoded region stored in the frame memory 108, and further computes prediction errors in pixel units from prediction image data corresponding to the subblock of interest in the input image data, and outputs the computed errors to the transformation/quantization unit 105. Also, the prediction unit 104 outputs information such as subblock division and prediction mode to the encoding unit 110 and the image reconstruction unit 107 as prediction information.

The transformation/quantization unit 105 performs orthogonal transformation and quantization on the prediction errors input from the prediction unit 104 and generates residual coefficients. Specifically, the transformation/quantization unit 105, first, performs orthogonal transformation processing that depends on the size of the subblocks on the prediction errors and generates orthogonal transform coefficients. The transformation/quantization unit 105 then quantizes the orthogonal transform coefficients using the quantization matrices stored in the quantization matrix holding unit 103 according to the prediction mode and color component, and generates residual coefficients. In the present embodiment, in the case where subblock division is not performed and the intra-prediction mode is used, the quantization matrix in FIG. 8A is used for the orthogonal transform coefficients of the Y component, the quantization matrix in FIG. 8B is used for the orthogonal transform coefficients of the Cb component, and the quantization matrix in FIG. 8C for the orthogonal transform coefficients of the Cr component. Also, similarly, in the case where subblock division is not performed and the inter-prediction mode is used instead, the quantization matrix in FIG. 8D is used for the orthogonal transform coefficients of the Y component, the quantization matrix in FIG. 8E is used for the orthogonal transform coefficients of the Cb component, and the quantization matrix in FIG. 8F is used for the orthogonal transform coefficients of the Cr component. On the other hand, in the case where the subblock division in FIG. 7B is performed and the intra-prediction mode is used, the quantization matrix in FIG. 8G is used for the orthogonal transform coefficients of the Y component, the quantization matrix in FIG. 8H is used for the orthogonal transform coefficients of the Cb component, and the quantization matrix in FIG. 8I is used for the orthogonal transform coefficients of the Cr component. Also, similarly, in the case where the subblock division in FIG. 7B is performed and the inter-prediction mode is used instead, the quantization matrix in FIG. 8J is used for the orthogonal transform coefficients of the Y component, the quantization matrix in FIG. 8K is used for the orthogonal transform coefficients of the Cb component, and the quantization matrix in FIG. 8L is used for the orthogonal transform coefficients of the Cr component. The quantization matrices used are, however, not limited thereto. The generated residual coefficients and chroma integration information are output to the encoding unit 110 and the inverse quantization/inverse transformation unit 106.

The inverse quantization/inverse transformation unit 106 reconstructs the orthogonal transform coefficients by inverse quantization of the residual coefficients input from the transformation/quantization unit 105, using the corresponding quantization matrices stored in the quantization matrix holding unit 103. The inverse quantization/inverse transformation unit 106 further performs inverse orthogonal transformation on the reconstructed orthogonal transform coefficients to reconstruct the prediction errors. In the inverse quantization processing, the quantization matrices corresponding to the size and color component of the subblocks to be encoded are used, similarly to the transformation/quantization unit 105. Specifically, the inverse quantization/inverse transformation unit 106 performs inverse quantization using the same quantization matrices used by the transformation/quantization unit 105. That is, in the case where subblock division is not performed and the intra-prediction mode is used, the quantization matrix in FIG. 8A is used for the orthogonal transform coefficients of the Y component, the quantization matrix in FIG. 8B is used for the orthogonal transform coefficients of the Cb component, and the quantization matrix in FIG. 8C is used for the orthogonal transform coefficients of the Cr component. Also, similarly, in the case where subblock division is not performed and the inter-prediction mode is used instead, the quantization matrix in FIG. 8D is used for the orthogonal transform coefficients of the Y component, the quantization matrix in FIG. 8E is used for the orthogonal transform coefficients of the Cb component, and the quantization matrix in FIG. 8F is used for the orthogonal transform coefficients of the Cr component. On the other hand, in the case where the subblock division in FIG. 7B is performed and the intra-prediction mode is used, the quantization matrix in FIG. 8G is used for the orthogonal transform coefficients of the Y component, the quantization matrix in FIG. 8H is used for the orthogonal transform coefficients of the Cb component, and the quantization matrix in FIG. 8I is used for the orthogonal transform coefficients of the Cr component. Also, similarly, in the case where the subblock division in FIG. 7B is performed and the inter-prediction mode is used instead, the quantization matrix in FIG. 8J is used for the orthogonal transform coefficients of the Y component, the quantization matrix in FIG. 8K is used for the orthogonal transform coefficients of the Cb component, and the quantization matrix in FIG. 8L is used for the orthogonal transform coefficients of the Cr component.

The prediction errors reconstructed by performing inverse orthogonal transformation to the orthogonal transform coefficients thus reconstructed are output to the image reconstruction unit 107.

The image reconstruction unit 107 reconstructs the prediction image with reference to the frame memory 108 as appropriate, based on the prediction information input from the prediction unit 104. The image reconstruction unit 107 then generates reconstruction image data in subblock units, based on the reconstructed prediction image and the prediction errors of the subblocks reconstructed by the inverse quantization/inverse transformation unit 106, and stores the generated reconstruction image data in the frame memory 108.

The in-loop filter unit 109 reads out the reconstruction image data from the frame memory 108, and performs in-loop filtering such as deblock filtering. The in-loop filter unit 109 then re-stores the filtered image data in the frame memory 108.

The encoding unit 110 entropy encodes the residual coefficients and chroma integration information in subblock units generated by the transformation/quantization unit 105 and the prediction information input from the prediction unit 104, and generate encoded data. While no particular method of entropy encoding is designated, methods such as Golomb coding, arithmetic coding and Huffman coding can be used. The encoding unit 110 outputs the generated encoded data to the integration encoding unit 111.

The integration encoding unit 111 multiplexes the encoded data input from the encoding unit 110 and the like together with the above encoded data of the header to form a bitstream. The integration encoding unit 111 then outputs the formed bitstream externally (to a storage medium, network, etc.) from the output terminal 112.

Figure 6A:
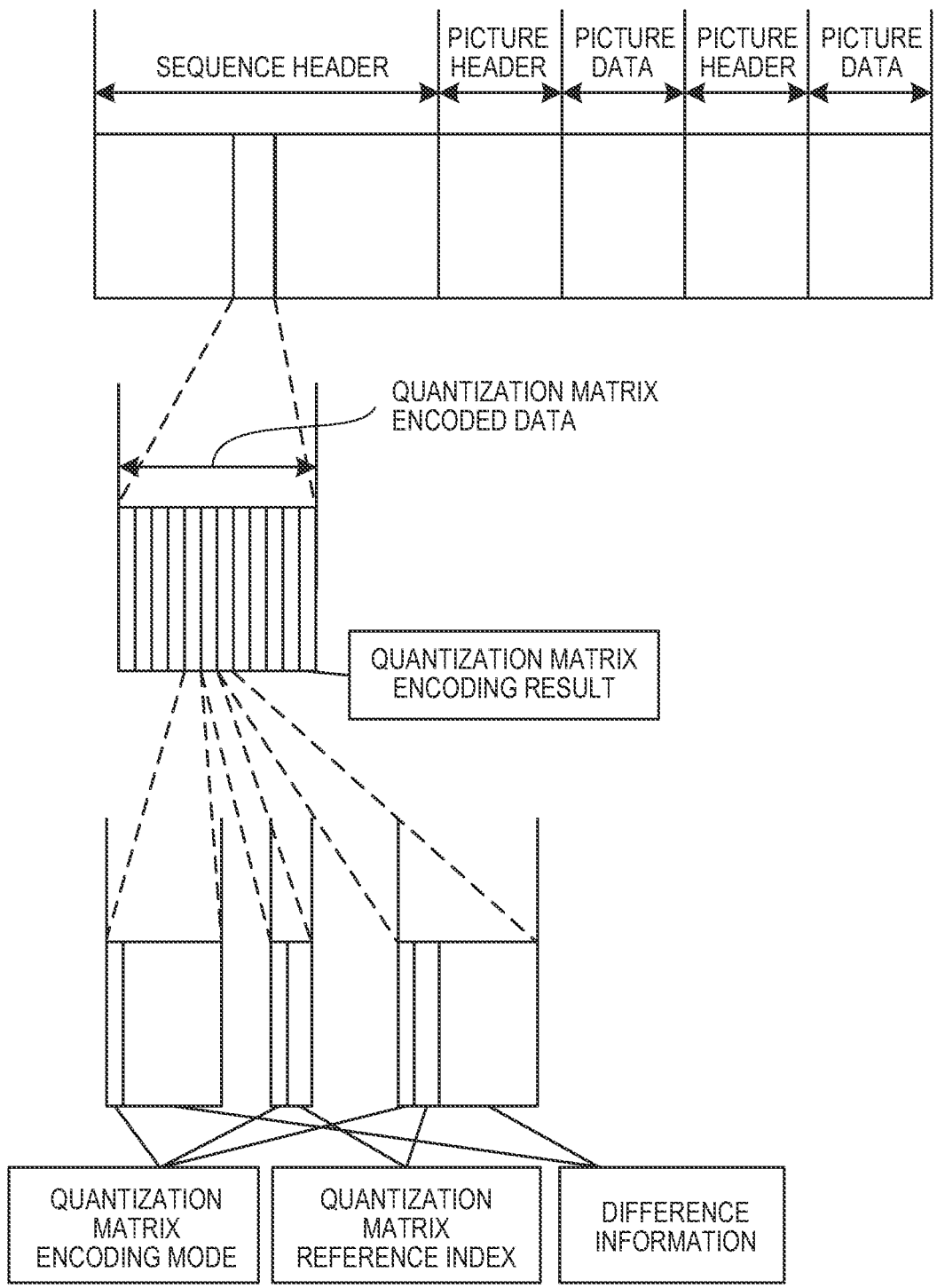
FIG. 6A is a diagram showing an example of the data structure of a bitstream generated by the image encoding apparatus of the first embodiment.
Figure 6B:
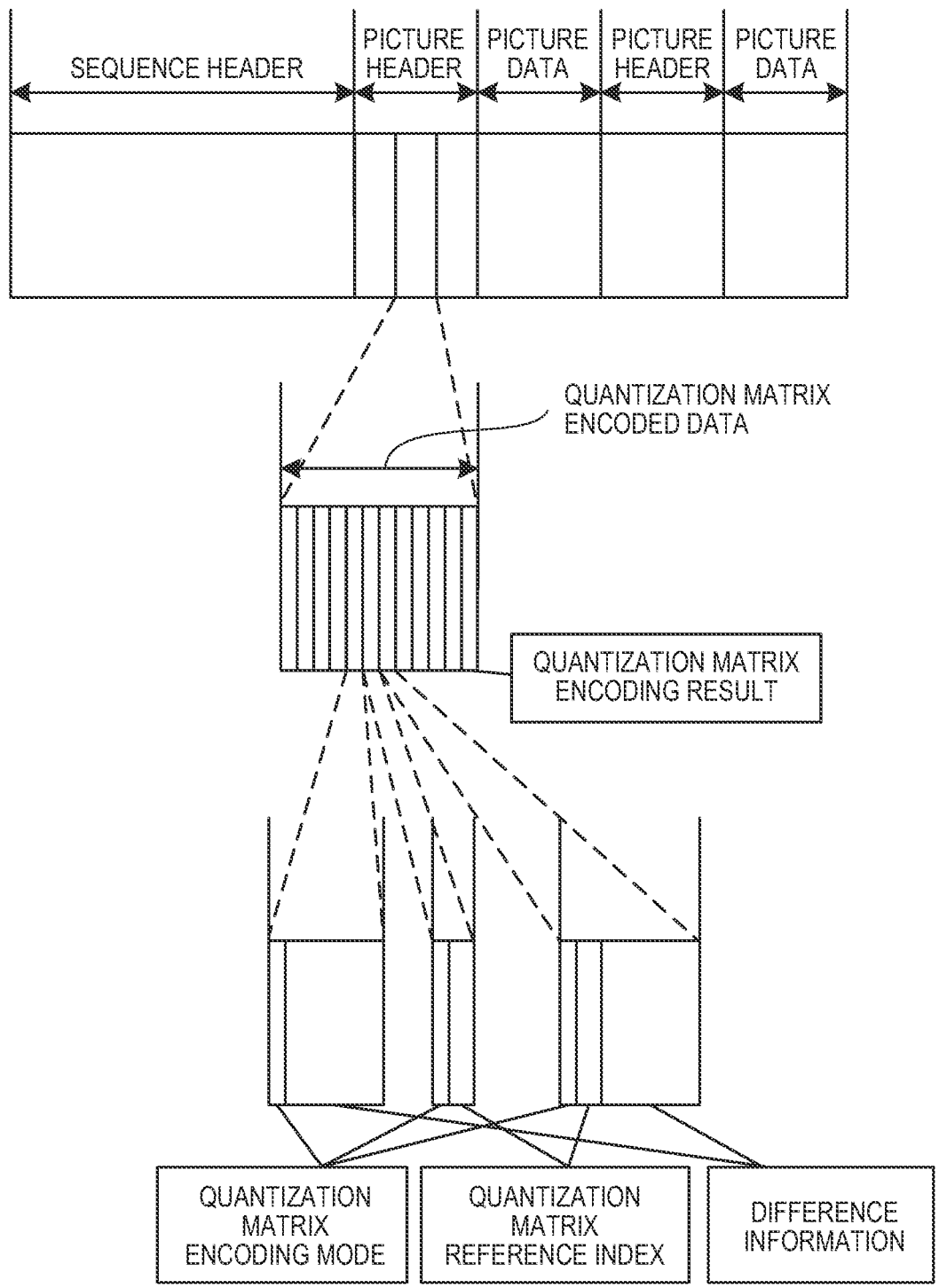
FIG. 6B is a diagram showing an example of the data structure of a bitstream generated by the image encoding apparatus of the first embodiment.

FIG. 6A is an example of the data structure of the output bitstream in the present embodiment. The sequence header includes the encoded data of the quantization matrices and is constituted by the encoding results of the quantization matrices. The position where the encoded data of the quantization matrices is stored is, however, not limited thereto, and a configuration may also naturally be adopted in which the encoded data is arranged in a picture header portion such as is shown in FIG. 6B or a header portion spanning a plurality of pictures. Also, when changing quantization matrices in a single sequence, updating is also possible by newly encoding quantization matrices. At this time, all of the quantization matrices may be overwritten, and it is also possible to adopt a configuration in which some of the quantization matrices are changed by specifying the size, prediction mode and color component of the quantization matrices corresponding to the quantization matrices to be overwritten.

Figure 3:
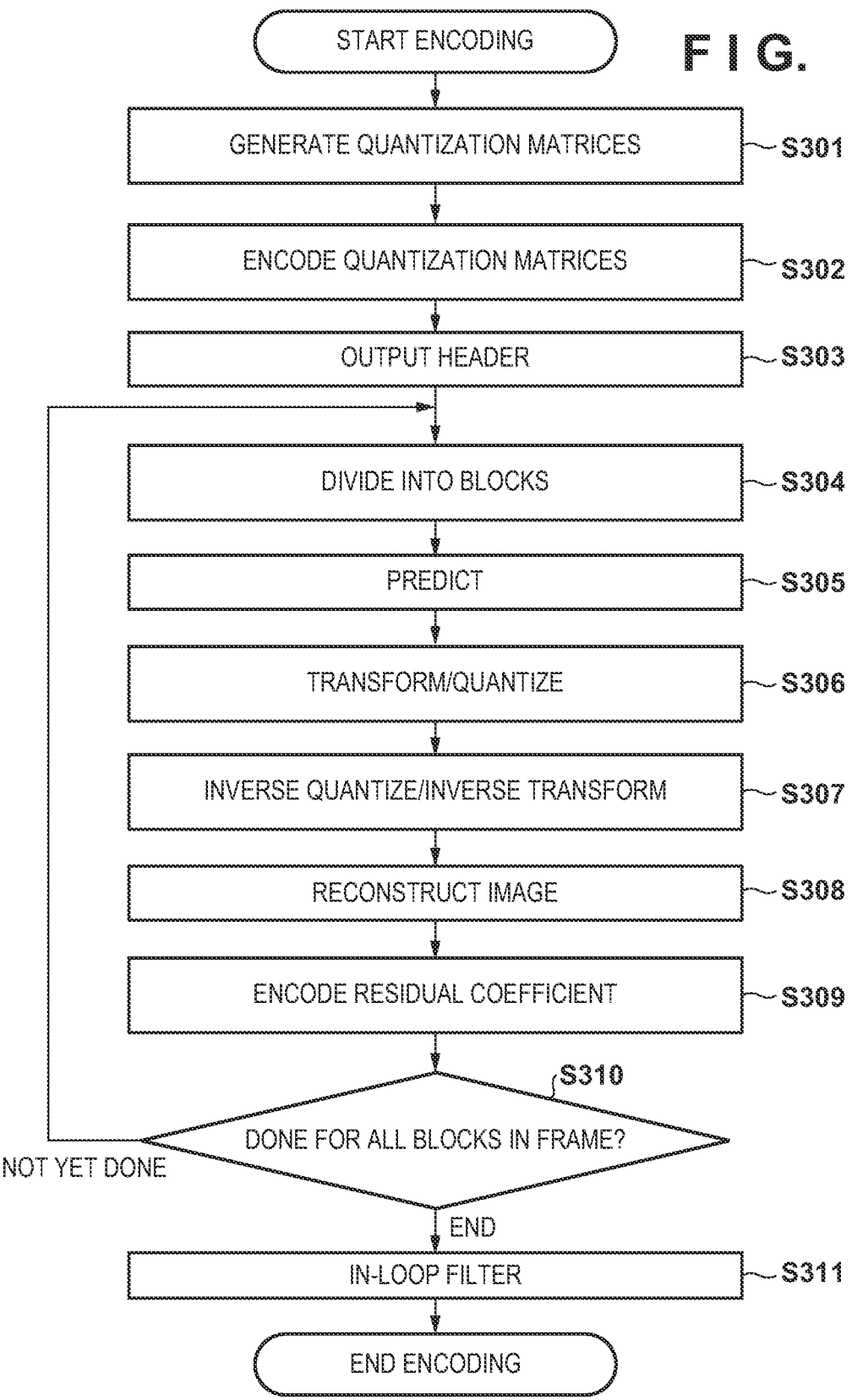
FIG. 3 is a flowchart showing encoding processing in the image encoding apparatus of the first embodiment.

FIG. 3 is a flowchart showing one frame of encoding processing of the control unit 150 in the image encoding apparatus of the embodiment.

First, prior to encoding the image, the control unit 150, in step S301, controls the quantization matrix holding unit 103 to generate and hold two-dimensional quantization matrices. The quantization matrix holding unit 103 of the present embodiment is compatible with 8×8 to 2×2 pixel-sized blocks, and generates and holds quantization matrices that correspond to the respective color components and prediction modes shown in FIGS. 8A to 8L.

In step S302, the control unit 150 controls the quantization matrix encoding unit 113 to encode the quantization matrices generated and held in step S301. The specific operations of the quantization matrix encoding unit 113 here have been described and will thus be omitted. In the present embodiment, the control unit 150 controls the quantization matrix encoding unit 113 to perform encoding based on the syntax table in FIG. 12 on the quantization matrices 801 to 811 shown in FIGS. 8A to 8L and generate quantization matrix encoded data.

In step S303, the control unit 150 controls the integration encoding unit 111 to encode and output header information required in encoding the image data together with the generated quantization matrix encoded data.

In step S304, the control unit 150 controls the block division unit 102 to divide the input image in frame units into basic block units.

In step S305, the control unit 150 controls the prediction unit 104 to divide the image data in basic blocks generated in step S304 into subblocks, execute prediction processing on each subblock, and generate prediction image data and prediction information such as subblock division information and prediction modes. Furthermore, the control unit 150 controls the prediction unit 104 to compute prediction errors from the input image data of the subblocks and the prediction image data.

In step S306, the control unit 150 controls the transformation/quantization unit 105 to perform orthogonal transformation on the prediction errors computed in step S305, and generate orthogonal transform coefficients. Furthermore, the control unit 150 controls the transformation/quantization unit 105 to perform quantization using the quantization matrices generated and held in step S301, and generate residual coefficients. In the present embodiment, the quantization matrices in FIGS. 8A to 8L are used according to the subblock size, the prediction mode and the color component.

In step S307, the control unit 150 controls the inverse quantization/inverse transformation unit 106 to perform inverse quantization on the residual coefficients generated in step S306, using the quantization matrices generated and held in step S301, and reconstruct the orthogonal transform coefficients. In this step, inverse quantization processing is performed using the same quantization matrices as used in step S306. Inverse orthogonal transformation is then performed on the reconstructed orthogonal transform coefficients and the prediction errors are reconstructed.

In step S308, the control unit 150 controls the image reconstruction unit 107 to reconstruct the prediction image based on the prediction information generated in step S305, reconstruct the image data from the reconstructed prediction image and the prediction errors generated in step S307, and store the reconstructed image data in the frame memory 108.

In step S309, the control unit 150 controls the encoding unit 110 to perform encoding of the prediction information generated in step S305 and the residual coefficient generated in step S306, and generate encoded data. Also, the encoding unit 110 outputs the generated encoded data to the integration encoding unit 111. The integration encoding unit 111 positions the encoded data from the encoding unit 110 to follow the header generated previously, and outputs the resultant data.

In step S310, the control unit 150 determines whether all the basic blocks within the frame of interest have been encoded. The control unit 150 advances to step S311 if it is determined that encoding has finished, and, if it is determined that there remain any basic blocks that have not been encoded, returns the processing to step S304 and continues encoding on the next basic block.

In step S311, the control unit 150 controls the in-loop filter unit 109 to perform in-loop filtering on the image data reconstructed in step S308 and generate a filtered image, and ends the processing.

In the above configuration and operations, the generated code amount of the quantization matrices can be suppressed, particularly by determining and encoding the quantization matrix encoding mode that minimizes the generated code amount of the quantization matrices in step S302.

Note that, in the present embodiment, it is only possible to reference quantization matrices of the same size in the quantization matrix reference mode and the inter-quantization matrix difference encoding mode, but a configuration may also be adopted in which it is possible to reference quantization matrices of different sizes using enlargement and reduction. For example, when encoding the quantization matrix 806 in FIG. 8G, a configuration may also be adopted in which the quantization matrix 807 in FIG. 8H is referenced and enlarged, and the difference values between the two quantization matrixes are encoded as difference information. It thereby becomes possible to further reduce the data amount of the quantization matrix that is initially encoded in each size.

Also, in the present embodiment, as shown in the syntax table in FIG. 12, a configuration is adopted in which the quantization matrices are encoded in ascending order of size, but a configuration may also be adopted in which the quantization matrices are encoded in descending order of size. It is thereby possible to further reduce the data amount of the quantization matrices, particularly in the aforementioned case where reference between quantization matrices of different sizes is possible.

Furthermore, in the present embodiment, the reference target of the quantization matrices is limited to encoded quantization matrices, but a configuration can also be adopted in which the reference target is flat quantization matrices, such as is shown in FIGS. 13A to 13C, that are standard in the case where quantization matrices are not used. It is thereby possible to further reduce the data amount of quantization matrices, particularly in the case where the quantization matrices to be encoded approximate a flat quantization matrix.

Figure 2:
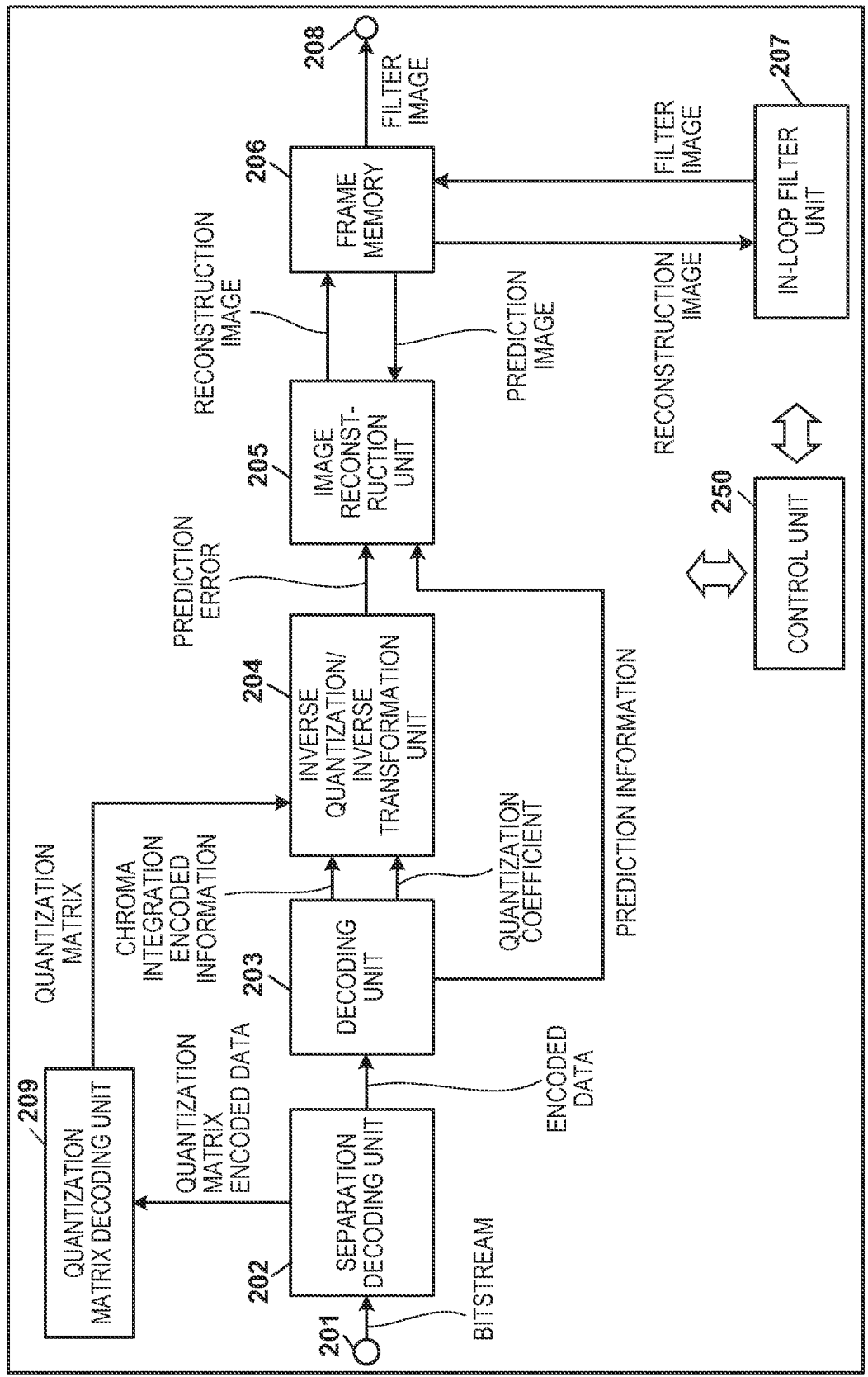
FIG. 2 is a block configuration diagram of an image decoding apparatus of the first embodiment.

FIG. 2 is a block configuration diagram of an image decoding apparatus that decodes encoded image data generated by the image encoding apparatus. Hereinafter, the configuration and operations related to decoding processing will be described with reference to FIG. 2.

The image decoding apparatus has a control unit 250 that administers overall control of the apparatus. The control unit 250 has a CPU, a ROM for storing programs that are executed by the CPU, and a RAM that is utilized as a work area of the CPU. Also, the image decoding apparatus has an input terminal 201, a separation and decoding unit 202, a decoding unit 203, an inverse quantization/inverse transformation unit 204, an image reconstruction unit 205, a frame memory 206, an in-loop filter unit 207, an output terminal 208 and a quantization matrix decoding unit 209.

The input terminal 201 inputs encoded bitstreams, with the input source being a storage medium storing encoded streams, for example, but encoded bitstreams may be input from a network, and there is no limitation on the type of encoded bitstream.

The separation and decoding unit 202 separates information relating to decoding processing and encoded data relating coefficients from the bitstream, and decodes encoded data that is in the header portion of the bitstream. The separation and decoding unit 202 of the present embodiment separates quantization matrix encoded data and outputs the separated quantization matrix encoded data to the quantization matrix decoding unit 209. Also, the separation and decoding unit 202 outputs encoded data of the image to the decoding unit 203. That is, the separation and decoding unit 202 performs the reverse operation from the integration encoding unit 111 in FIG. 1.

The quantization matrix decoding unit 209 reconstructs and holds quantization matrices by decoding the quantization matrix encoded data supplied from the separation and decoding unit 202.

The decoding unit 203 decodes the encoded data of the image output from the separation and decoding unit 202 and reconstructs residual coefficients and prediction information in subblock units.

The inverse quantization/inverse transformation unit 204 reconstructs prediction errors by performing inverse quantization on the residual coefficients of the subblock of interest using the reconstructed quantization matrices, obtaining coefficients subjected to inverse quantization, and executing inverse orthogonal transformation, similarly to the inverse quantization/inverse transformation unit 106 in FIG. 1.

The image reconstruction unit 205 generates prediction image data with reference to the frame memory 206 as appropriate based on the input prediction information. The image reconstruction unit 205 then generates reconstruction image data of the subblock of interest from the prediction errors reconstructed with the prediction image data and the inverse quantization/inverse transformation unit 204, and stores the generated reconstruction image data in the frame memory 206.

The in-loop filter unit 207 performs in-loop filtering such as deblocking filtering on the reconstruction image data stored in the frame memory 206, and re-stores the filtered image data in the frame memory 206, similarly to the in-loop filter unit 109 in FIG. 1.

The output terminal 208 sequentially outputs frame images stored in the frame memory 206 externally. The output destination is generally a display device, but may be other devices.

Operations relating to decoding of an image by the image decoding apparatus of the above embodiment will now be described in more detail. In the present embodiment, encoded bitstreams are input in frame units.

In FIG. 2, the bitstream for one frame input from the input terminal 201 is supplied to the separation and decoding unit 202. The separation and decoding unit 202 separates information relating to the decoding processing and encoded data relating to coefficients from the bitstream, and decodes the encoded data that is in the header portion of the bitstream.

The separation and decoding unit 202 then supplies quantization matrix encoded data that is included in the header portion to the quantization matrix decoding unit 209, and supplies encoded data of the image data to the decoding unit 203. Specifically, the separation and decoding unit 202 first extracts quantization matrix encoded data from the sequence header of the bitstream shown in FIG. 6A, and outputs the extracted quantization matrix encoded data to the quantization matrix decoding unit 209. In the present embodiment, quantization matrix encoded data corresponding to the quantization matrices shown in FIGS. 8A to 8L is extracted and output. Next, encoded data in basic block units of the picture data is extracted and output to the decoding unit 203.

The quantization matrix decoding unit 209, first, decodes the input quantization matrix encoded data, and reconstructs the encoding result of each quantization matrix generated on the encoding side, based on the syntax table shown in FIG. 12. As shown in FIG. 6A, the encoding result of each quantization matrix is constituted by a quantization matrix encoding mode and data corresponding to the quantization matrix encoding mode.

For example, if the quantization matrix encoding mode, that is, scaling_list_pred_mode_idx in the syntax table in FIG. 12 is 0, this means that the quantization matrix was encoded in the quantization matrix reference mode. In this case, the quantization matrix encoding result is constituted by a quantization matrix encoding mode (0) and a quantization matrix reference index. For example, when decoding a 4×4 quantization matrix for intra-prediction and the Cb component, the quantization matrix decoding unit 209 first reconstructs the quantization matrix encoding mode=0, which means the quantization matrix reference mode. The quantization matrix decoding unit 209 then reconstructs the quantization matrix reference index. In the case where the quantization matrix reference index indicates that the quantization matrix to be referenced is the most recently decoded quantization matrix, the quantization matrix reference index will be 0. If the quantization matrix reference index is 1, the second most recently decoded quantization matrix is referenced. As a result of this information, the quantization matrix 209 knows that the 4×4 quantization matrix for intra-prediction and the Cb component is the same as the quantization matrix 806 in FIG. 8G for intra-prediction and the Y component, and reconstructs the quantization matrix 801 in FIG. 8B.

Also, if the quantization matrix encoding mode, that is, scaling_list_pred_mode_idx in the syntax table in FIG. 12 is 1, this means that the quantization matrix was encoded in the inter-quantization matrix difference encoding mode. In this case, the quantization matrix encoding result is constituted by a quantization matrix encoding mode (1), a quantization matrix reference index and difference information. For example, when decoding a 4×4 quantization matrix for intra-prediction and the Cr component, the quantization matrix decoding unit 209 first reconstructs quantization matrix encoding mode=1, which means the inter-quantization matrix difference encoding mode. The quantization matrix decoding unit 209 then reconstructs the quantization matrix reference index. In the case where the quantization matrix reference index indicates that the quantization matrix to be referenced is the most recently decoded quantization matrix, the quantization matrix reference index will be 0. If the quantization matrix reference index is 1, the second most recently decoded quantization matrix is referenced. Subsequently, the quantization matrix decoding unit 209 decodes the difference information, that is, scaling_list_pred_delta in the syntax table in FIG. 12, for the number of elements in the quantization matrix, and reconstructs the one-dimensional difference value matrix 1001 shown in FIG. 10B. The quantization matrix decoding unit 209 arranges the one-dimensional difference value matrix 1001 in FIG. 10B two dimensionally using the scanning method in FIG. 9B, and obtains the two-dimensional difference value matrix 1000 shown in FIG. 10A. The quantization matrix decoding unit 209 then adds each difference value of the two-dimensional difference value matrix 1000 in FIG. 10A to the respective element of the quantization matrix 801 to be referenced in FIG. 8B, and reconstructs the quantization matrix 802 in FIG. 8C.

On the other hand, if the quantization matrix encoding mode, that is, scaling_list_pred_mode_idx in the syntax table in FIG. 12 is 2, this means that the quantization matrix was encoded in the intra-quantization matrix difference encoding mode. In this case, the quantization matrix encoding result is constituted by a quantization matrix encoding mode (2) and difference information. For example, when decoding a 4×4 quantization matrix for intra-prediction and the Y component, the quantization matrix decoding unit 209, first, reconstructs quantization matrix encoding mode=2, which means the intra-quantization matrix difference encoding mode. The quantization matrix decoding unit 209 then decodes the difference information, that is, scaling_list_delta_coef in the syntax table in FIG. 12 for the number of elements in the quantization matrix, and reconstructs the one-dimensional difference value matrix 1002 shown in FIG. 10C. The quantization matrix decoding unit 209 is arranged two dimensionally using the scanning method in FIG. 9B while adding each difference value within the one-dimensional difference value matrix 1002 in FIG. 10C to the corresponding immediately previous element, and reconstructs the quantization matrix 806 in FIG. 8G.

Note that, in the present embodiment, the encoding table in FIG. 11A is used in decoding the difference information, but the encoding table in FIG. 11B may also be used. In short, the same encoding table as on the encoding side may be used. The quantization matrix decoding unit 209 then holds the quantization matrices 800 to 811 thus reconstructed. Here, the operation is the reverse of the operation by the quantization matrix encoding unit 113 on the encoding side.

The decoding unit 203 decodes the encoded data supplied from the separation and decoding unit 202, reconstructs the prediction information, and further reconstructs the residual coefficients. First, the decoding unit 203 reconstructs the prediction information and acquires the prediction mode that is used in the subblocks. The decoding unit 203 outputs the reconstructed residual coefficients to the inverse quantization/inverse transformation unit 204, and outputs the reconstructed prediction information to the image reconstruction unit 205.

The inverse quantization/inverse transformation unit 204 performs inverse quantization on the input residual coefficients using the quantization matrices reconstructed by the quantization matrix decoding unit 209 to generate orthogonal transform coefficients, and further performs inverse orthogonal transformation to reconstruct the prediction errors. The inverse quantization/inverse transformation unit 204 performs inverse quantization using the quantization matrices corresponding to the size and color component of the decoded subblocks, similarly to the inverse quantization/inverse transformation unit 106 on the encoding side. That is, in the case where subblock division is not performed and the intra-prediction mode is used, the quantization matrix in FIG. 8A is used for the orthogonal transform coefficients of the Y component, the quantization matrix in FIG. 8B is used for the orthogonal transform coefficients of the Cb component, and the quantization matrix in FIG. 8C is used for the orthogonal transform coefficients of the Cr component. Also, similarly, in the case where subblock division is not performed and the inter-prediction mode is used instead, the quantization matrix in FIG. 8D is used for the orthogonal transform coefficients of the Y component, the quantization matrix in FIG. 8E is used for the orthogonal transform coefficients of the Cb component, and the quantization matrix in FIG. 8F is used for the orthogonal transform coefficients of the Cr component. On the other hand, in the case where the subblock division in FIG. 7B is performed and the intra-prediction mode is used, the quantization matrix in FIG. 8G is used for the orthogonal transform coefficients of the Y component, the quantization matrix in FIG. 8H is used for the orthogonal transform coefficients of the Cb component, and the quantization matrix in FIG. 8I is used for the orthogonal transform coefficients of the Cr component. Also, similarly, in the case where the subblock division in FIG. 7B is performed and the inter-prediction mode is used instead, the quantization matrix in FIG. 8J is used for the orthogonal transform coefficients of the Y component, the quantization matrix in FIG. 8K is used for the orthogonal transform coefficients of the Cb component, and the quantization matrix in FIG. 8L is used for the orthogonal transform coefficients of the Cr component.

The prediction errors reconstructed by performing inverse orthogonal transformation on the orthogonal transform coefficients thus reconstructed are output to the image reconstruction unit 205. The quantization matrices that are used are, however, not limited thereto, and may be the same as the quantization matrices used by the transformation/quantization unit 105 and the inverse quantization/inverse transformation unit 106 on the encoding side.

The image reconstruction unit 205 reconstructs the prediction image with reference to the frame memory 206 as appropriate, based on the prediction information input from the decoding unit 203. With the image reconstruction unit 205 of the present embodiment, intra-prediction and inter-prediction are used, similarly to the prediction unit 104 on the encoding side. Since the specific prediction processing is similar to the prediction unit 104 on the encoding side, description thereof will be omitted. The image reconstruction unit 205 reconstructs image data from this prediction image and the prediction errors input from the inverse quantization/inverse transformation unit 204, and stores the reconstructed image data in the frame memory 206. The stored image data is used for reference during prediction.

The in-loop filter unit 207 reads out the reconstruction image from the frame memory 206 and performs in-loop filtering such as deblocking filtering, similarly to the in-loop filter unit 109 on the encoding side. The in-loop filter unit 207 then re-stores the filtered image in the frame memory 206.

The reconstruction image stored in the frame memory 206 is ultimately output externally (typically to a display device) from the output terminal 208.

Figure 4:
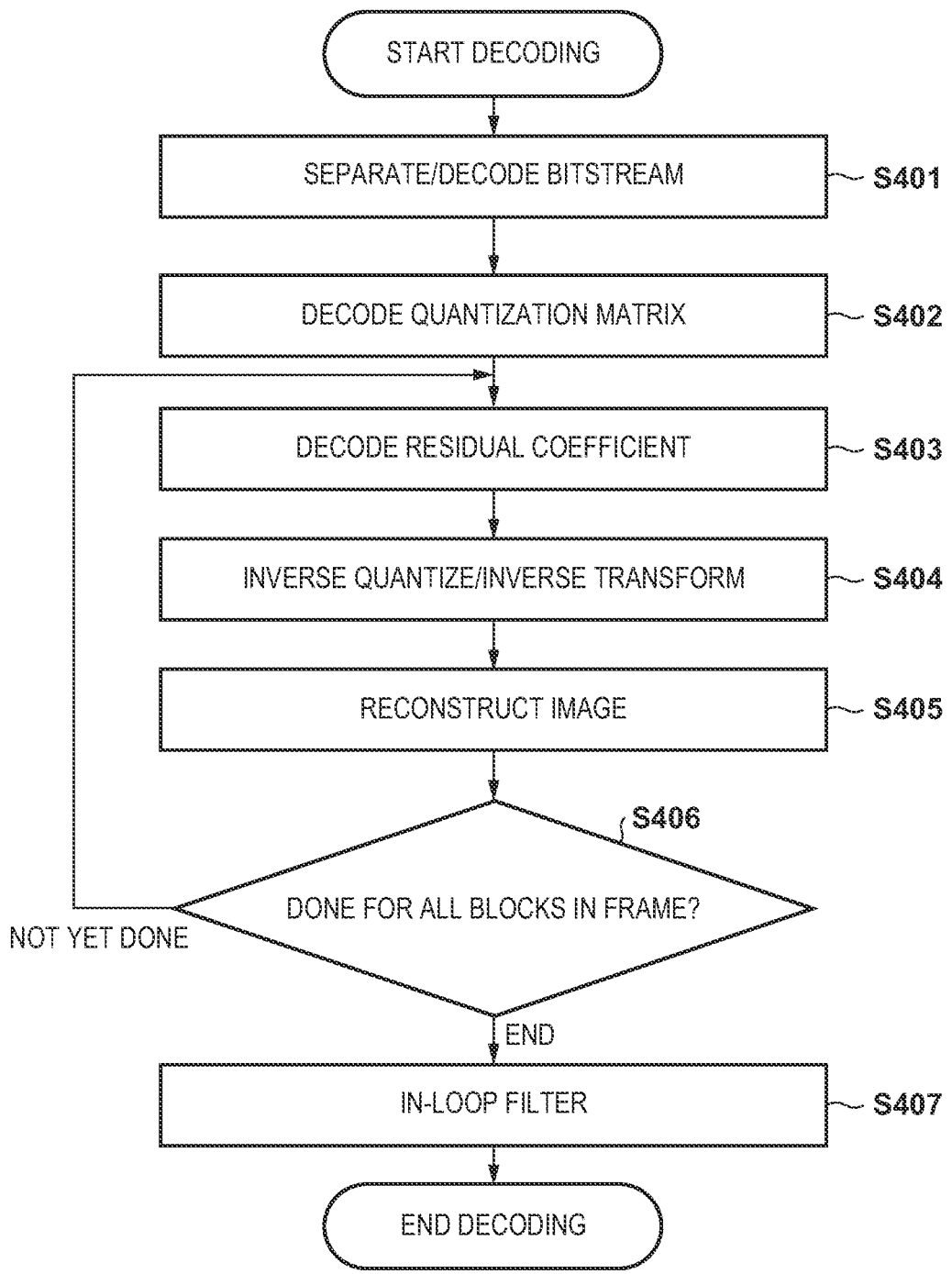
FIG. 4 is a flowchart showing decoding processing in the image decoding apparatus of the first embodiment.

FIG. 4 is a flowchart showing decoding processing by the control unit 250 in the image decoding apparatus according to the present embodiment.

First, in step S401, the control unit 250 controls the separation and decoding unit 202 to separate information relating to decoding processing and encoded data relating to coefficients from the bitstream, and decode the encoded data of the header portion. More specifically, the separation and decoding unit 202 supplies the encoded data of the quantization matrices to the quantization matrix decoding unit 209, and supplies the encoded data of the image to the decoding unit 203.

In step S402, the control unit 250 controls the quantization matrix decoding unit 209 to decode the quantization matrix encoded data reconstructed in step S401 based on the syntax table in FIGS. 12, and reconstruct and hold the quantization matrices 801 to 811 shown in FIGS. 8A to 8L. The specific operations of the quantization matrix decoding unit 209 referred to here have been described and will thus be omitted.

In step S403, the control unit 250 controls the decoding unit 203 to decode the encoded data separated in step S401, reconstruct the prediction information, and reconstruct the residual coefficients.

In step S404, the control unit 250 controls the inverse quantization/inverse transformation unit 204 to perform inverse quantization on the residual coefficients using the quantization matrices reconstructed in step S402 and generate orthogonal transform coefficients. The inverse quantization/inverse transformation unit 204 further performs inverse orthogonal transformation and reconstructs the prediction errors. In the present embodiment, the quantization matrices that are used in the inverse quantization processing are determined according to characteristics of the subblocks to be decoded such as color component and size. That is, the inverse quantization/inverse transformation unit 204 performs inverse quantization using the quantization matrices in FIGS. 8A to 8L according to characteristics of the subblocks such as size, prediction mode and color component. The quantization matrices that are used are, however, not limited thereto, and may be the same as the quantization matrices used on the encoding side.

In step S405, the control unit 250 controls the image reconstruction unit 205 to reconstruct the image based on the prediction information generated in step S403. Specifically, the image reconstruction unit 205 reconstructs the prediction image with reference to the frame memory 206, based on the prediction information. At this time, the image reconstruction unit 205 uses intra-prediction and inter-prediction, similarly to step S305 on the encoding side. The image reconstruction unit 205 then reconstructs the image data from the reconstructed prediction image and the prediction errors generated in step S404, and stores the reconstruction image data in the frame memory 206.

In step S406, the control unit 250 determines whether decoding of all the basic blocks in the frame of interest has ended, and advances to step S407 if ended, and, if there are any basic blocks that have not been decoded, returns the processing to step S403 in order to set the next basic block as the decoding target.

In step S407, the control unit 250 controls the in-loop filter unit 207 to perform in-loop filtering on the image data reconstructed in step S405 and generate a filtered image, and ends the processing.

Due to the above configuration and operations, an encoded bitstream generated by the image encoding apparatus described above, that is, a bitstream encoded in an appropriate quantization matrix encoding mode and in which the generated code amount of the quantization matrix is suppressed, can be decoded.

Note that, in the present embodiment, it is only possible to reference quantization matrices of the same size in the quantization matrix reference mode and the inter-quantization matrix difference encoding mode, but a configuration may also be adopted in which it is possible to reference quantization matrices of different sizes using enlargement and reduction. For example, when decoding the quantization matrix 806 in FIG. 8G, a configuration may also be adopted in which the quantization matrix 807 in FIG. 8H is referenced and enlarged, the difference values between the two quantization matrixes are decoded as difference information, and the quantization matrix is reconstructed. It thereby becomes possible to also decode a bitstream in which the data amount of the quantization matrix that is initially encoded in each size has been further reduced.

Also, in the present embodiment, as shown in the syntax table in FIG. 12, a configuration is adopted in which the quantization matrices are decoded in ascending order of size, but a configuration may also be adopted in which the quantization matrices are decoded in descending order of size. It is thereby possible to decode a bitstream in which the data amount of the quantization matrices has been further reduced, particularly in the aforementioned case where reference between quantization matrices of different sizes is possible.

Furthermore, in the present embodiment, the reference target of the quantization matrices is limited to encoded quantization matrices, but a configuration can also be adopted in which the reference target is flat quantization matrices 1300 to 1302, such as is shown in FIGS. 13A to 13C, that are standard in the case where quantization matrices are not used. It is thereby possible to decode a bitstream in which the data amount of quantization matrices has been reduced, particularly in the case where the quantization matrices to be decoded approximate a flat quantization matrix.

Second Embodiment

The processing units included in the image encoding apparatus and the image decoding apparatus of the first embodiment are described as being constituted by hardware. However, the processing that is performed in each processing unit shown in the diagrams may be configured with a computer program.

Figure 5:
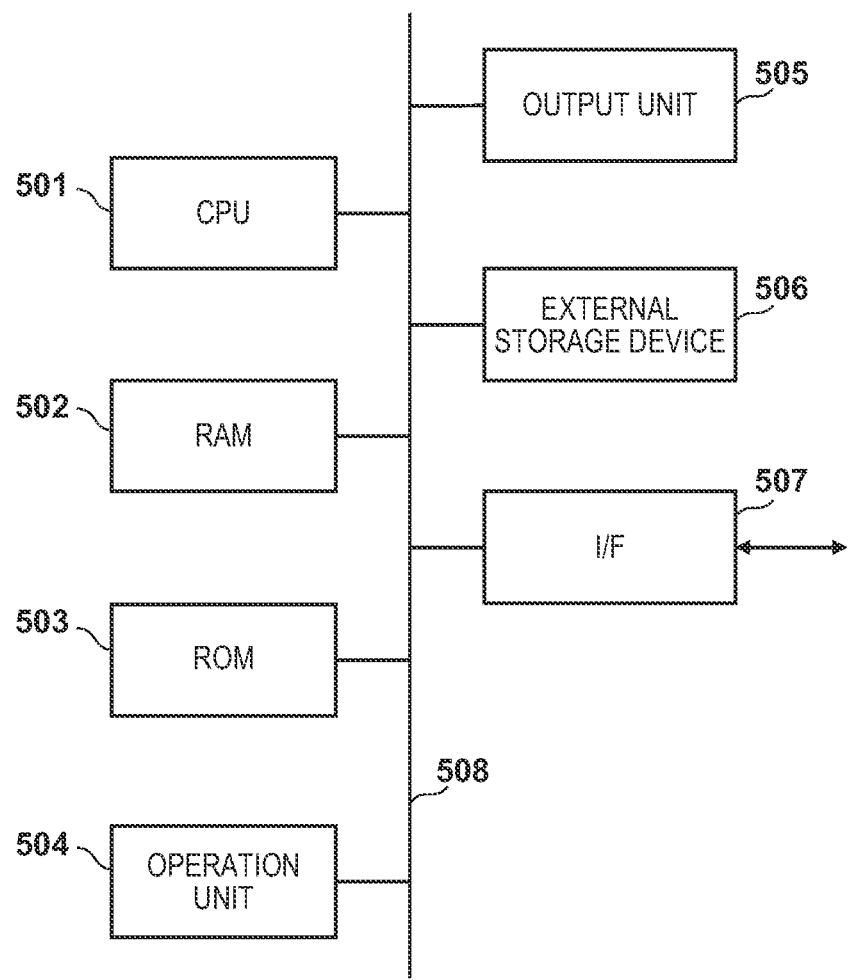
FIG. 5 is a configuration diagram of computer hardware applied in a second embodiment.

FIG. 5 is a block diagram showing a configuration example of computer hardware applicable to the image encoding apparatus and decoding apparatus according to the above embodiment.

A CPU 501 performs overall control of the computer using computer programs and data that are stored in a RAM 502 and a ROM 503, and executes the respective processing described above as performed by an image processing apparatus according to the above embodiment. That is, the CPU 501 functions as the respective processing units shown in FIGS. 1 and 2.

The RAM 502 has an area for temporarily storing data acquired from outside via an external storage device 506 and an I/F (interface) 507. Furthermore, the RAM 502 is also utilized as a work area that the CPU 501 uses when executing various processing. The RAM 502 can be allocated as frame memory or various other areas can be provided as appropriate, for example.

The ROM 503 stores setting data of the computer and a boot program. An operation unit 504 is constituted by a keyboard, a mouse and the like, and various instructions can be input to the CPU 501 by the user of the computer performing operations. A display unit 505 displays the results of processing by the CPU 501. The display unit 505 is constituted by a liquid crystal display, for example.

The external storage device 506 is a large capacity information storage device typified by a hard disk drive device. The external storage device 506 stores an OS (operating system) and computer programs (application programs) for causing the CPU 501 to realize the functions of the various units shown in FIGS. 1 and 2. Furthermore, the respective image data to be processed may be stored in the external storage device 506.

The computer programs and data that are stored in the external storage device 506 are loaded to the RAM 502 as appropriate in accordance with control of the CPU 501 and undergo processing by the CPU 501. Networks such as a LAN and the Internet and other devices such as a projection device and a display device can be connected to the I/F 507, and the computer is able to acquire and send various information via the I/F 507. Reference numeral 508 denotes a bus that connects the above units.

In the above configuration, when the apparatus is powered on, the CPU 501 executes the boot program stored in the ROM 503, and loads the OS stored in the external storage device 506 to the RAM 502 and executes the loaded OS. The CPU 501, under the control of the OS, then loads application programs related to encoding or decoding from the external storage device 506 to the RAM 502 and executes the loaded application programs. As a result, the CPU 501 functions as the respective processing units in FIG. 1 or FIG. 2, and the apparatus functions as an image encoding apparatus or an image decoding apparatus.

Figure 14:
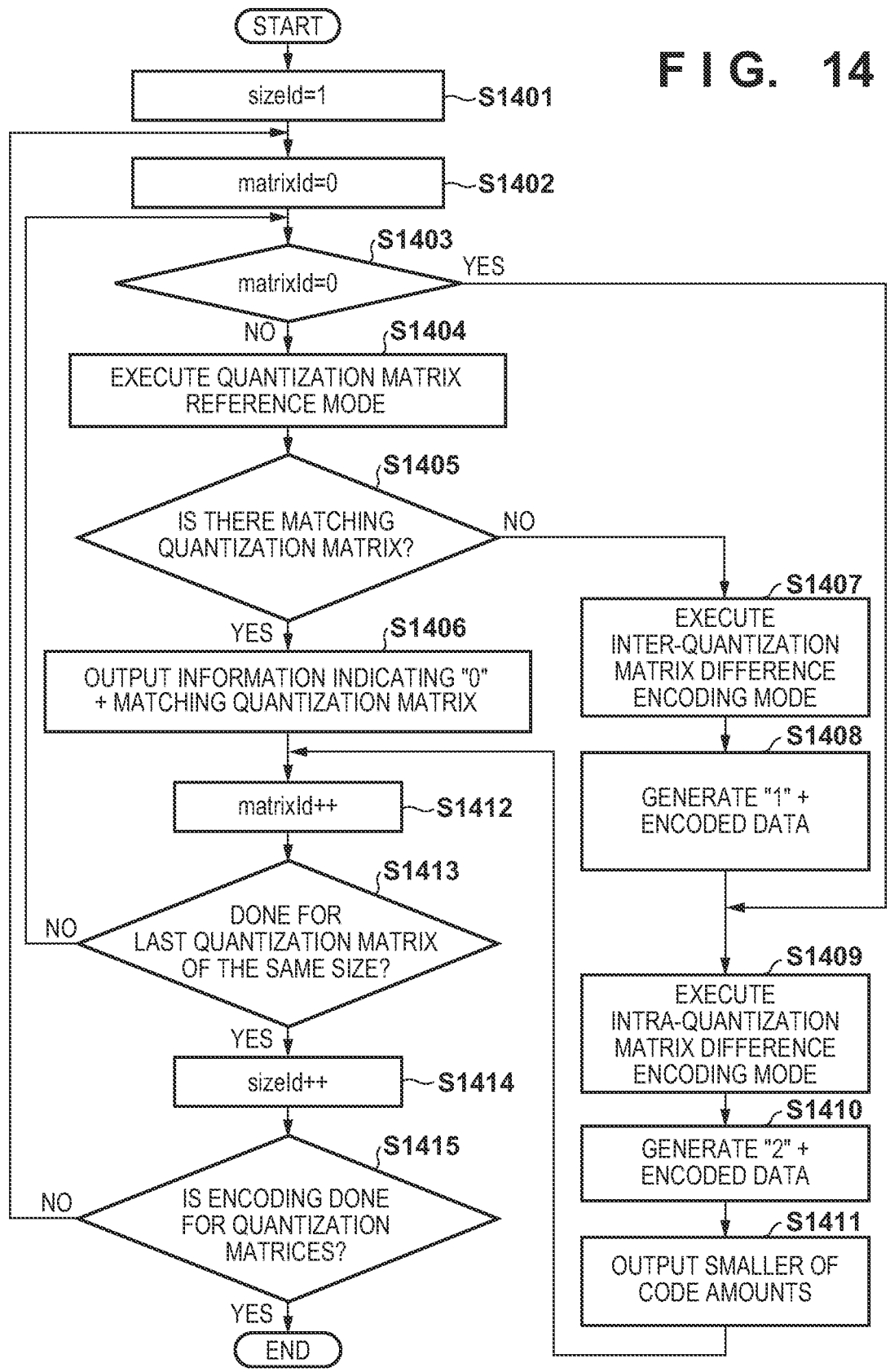
FIG. 14 is a flowchart showing a procedure for encoding a quantization matrix.

Here, the processing for encoding quantization matrices in this second embodiment, that is, the processing corresponding to step S302 in FIG. 3 will be described with reference to the flowchart in FIG. 14.

Note that the order of the quantization matrices that are encoded is the same as the first embodiment, and is initially the 2×2 pixel-sized quantization matrices 807→808→810→811 in order, followed by the 4×4 pixel-sized quantization matrices 806→801→802→809→804→806 in order, and finally the 8×8 pixel-sized quantization matrix 800→803 in order.

Also, the following variables sizeId and matrixId have the same meaning as those shown in the first embodiment.

In other words, the variable sizeId is a variable indicating the size of the quantization matrix, and when the sizeId is "1", this indicates that the size of the quantization matrix to be encoded is 2×2 pixels. Furthermore, when the sizeId is "2", this indicates that the size of the quantization matrix to be encoded is 4×4 pixels. Also, when the sizeId is "3", this indicates that the size of the quantization matrix to be encoded is 8×8 pixels. Also, the variable matrixId indicates the order of quantization matrices of the same size. The quantization matrices to be encoded are identified by sizeId and matrixId.

For example, when sizeId=2 and matrixId=0, this indicates that the first 4×4 pixel-sized quantization matrix 806 is the quantization matrix to be encoded.

First, in step S1401, the CPU 501 sets the size of the quantization matrix to be encoded to 2×2 pixels by setting the variable sizeId to "1" as the initial value. Next, in step S1402, the CPU 501 sets the matrixId to "0" as the initial value. As a result, the quantization matrix 807 in FIG. 8H is set as the quantization matrix of interest to be encoded in the case where this step S1402 is first executed.

In step S1403, the CPU 501 determines whether the matrixId is "0". If matrixId is other than "0", there will be an encoded quantization matrix of the same size as the quantization matrix of interest. Therefore, the CPU 501 advances the processing to step S1404 and performs search processing in the quantization matrix reference mode. In other words, the CPU 501 performs search processing as to whether there is an encoded quantization matrix of the same as the quantization matrix of interest.

In step S1405, the CPU 501 determines whether an encoded quantization matrix of the same as the quantization matrix of interest was found. If it is determined that such a quantization matrix was found, the CPU 501 advances the processing to step S1406, and outputs "0" and a value specifying the matching quantization matrix as encoded data of the quantization matrix of interest. Setting "0" at the start of the encoded data is equivalent to setting the parameter scaling_list_pred_mode_idx to "0". Also, with regard to the "value specifying the matching quantization matrix", the number "6" of 4×4 pixel-sized quantization matrices is greater than the number of quantization matrices of other sizes, and thus the bit number allocated to the value specifying that quantization matrix need only be "3". On the other hand, if it is determined that such a quantization matrix was not found, the CPU 501 advances the processing to step S1407.

If it is determined in step S1403 that the matrixId is "0", the CPU 501 advances the processing to step S1409.

In this step S1407, the CPU 501 executes the inter-quantization matrix difference encoding mode for the quantization matrix of interest. Then, in step S1408, the CPU 501 obtains "1" and the encoded data generated in the inter-quantization matrix difference encoding mode. Setting "1" at the start of the encoded data is equivalent to setting the parameter scaling_list_pred_mode_idx to "1". A configuration may also be adopted in which information indicating the order of the quantization matrix that is the same as the quantization matrix of interest is output following the value "1" set at the start of the encoded data, and difference encoded data is output thereafter.

Next, in step S1409, the CPU 501 executes the intra-quantization matrix difference encoding mode for the quantization matrix of interest. Then, in step S1410, the CPU 501 obtains "2" and encoded data generated in the inter-quantization matrix difference encoding mode. Setting "2" at the start of the encoded data is equivalent to setting the return value of scaling_list_pred_mode_idx to "2".

Then, in step S1411, the CPU 501 outputs the smaller of the encoded data generated in step S1408 and step S1410 as encoded data of the quantization matrix of interest. Note that, in the case of branching from step S1403 to step S1409, the encoded data generated in the inter-quantization matrix difference encoding mode in step S1409 is output.

In step S1412, the CPU 501 increases the variable matrixId by "1". Then, in step S1413, the CPU 501 determines whether all the quantization matrices of the same size as the quantization matrix of interest have been encoded, based on the variables sizeId and matrixId. If the determination result of step S1413 is "No", the CPU 501 advances the processing to step S1403 and repeats the above processing.

Also, if the determination result of step S1413 is "Yes", the CPU 501 increases sizeId by "1". Then, in step S1415, the CPU 501 determines whether the quantization matrices of all the sizes have been encoded, based on the variables sizeId and matrixId. If the determination result of step S1415 is "No", there are quantization matrices of a size that have not been encoded, and thus the CPU returns the processing to step S1402. Also, if the determination result of step S1415 is "Yes", this processing (step S302 in FIG. 3) is ended.

Note that, in the case where the processing advances to step S1406, it is assured that the encoded data generated in the quantization matrix reference mode will be reduced, and thus comparison with the encoded data generated in other modes is omitted, but naturally such comparison may be performed.

According to the present invention, it is possible to improve the encoding efficiency of image data by suppressing the code amount of quantization matrices more than before.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Industrial Applicability

The present invention is used in encoding apparatuses/decoding apparatuses that encode/decode still images/moving images. In particular, the invention can be applied to encoding methods and decoding methods that use quantization matrices.

The invention claimed is:
1. An image encoding apparatus comprising:
    a quantization unit configured to quantize transform coefficients in a block in an image, using a first quantization matrix; and
    an encoding unit configured to encode the first quantization matrix,
    wherein
        (a) in a case where a first mode is used to encode the first quantization matrix, the encoding unit encodes, into a scaling list data syntax structure, information indicating that the first quantization matrix is the same as a second quantization matrix to be refer- enced, and encodes, into the scaling list data syntax structure, information for specifying the second quantization matrix,
(b) in a case where a second mode is used to encode the first quantization matrix, the encoding unit encodes, into the scaling list data syntax structure, the information for specifying the second quantization matrix, and encodes, into the scaling list data syntax structure, information for deriving a difference between an element of the first quantization matrix and an element of the second quantization matrix, and
(c) in a case where a third mode is used to encode the first quantization matrix, the encoding unit encodes a difference between an element and another element within the first quantization matrix,
wherein a code amount of information representing that the first mode is used is less than a code amount of information representing that the second mode is used,
wherein the code amount of information representing that the first mode is used is not greater than a code amount of information representing that the third mode is used, and
wherein a size of the second quantization matrix can only be 2×2, 4×4, or 8×8.

2. The image encoding apparatus according to claim 1, wherein types of components of the blocks include a luma component and two chroma components, and transform coefficients of each component are quantized using the first quantization matrix corresponding to the component.

3. An image decoding apparatus comprising:
a decoding unit configured to decode a first quantization matrix; and
an inverse quantization unit configured to perform inverse quantization on residual coefficients, using the first quantization matrix,
wherein the decoding unit decodes, from a scaling list data syntax structure in a bitstream, first information representing a mode of decoding the first quantization matrix,
wherein (a) in a case where the first information decoded by the decoding unit represents that a first mode is used, the decoding unit decodes, from the scaling list data syntax structure, second information for specifying a second quantization matrix to be referenced and decodes the first quantization matrix by determining that the first quantization matrix is the same as the second quantization matrix specified based on the second information,
(b) in a case where the first information decoded by the decoding unit represents that a second mode is used, the decoding unit decodes, from the scaling list data syntax structure, the second information for specifying the second quantization matrix and decodes the first quantization matrix by using a difference between an element of the first quantization matrix and an element of the second quantization matrix specified based on the second information, and
(c) in a case where the first information decoded by the decoding unit represents that a third mode is used, the decoding unit decodes the first quantization matrix by using a difference between an element and another element within the first quantization matrix,
wherein a code amount of the first information representing that the first mode is used is less than a code amount of the first information representing that the second mode is used,
wherein the code amount of the first information representing that the first mode is used is not greater than a code amount of the first information representing that the third mode is used, and
wherein a size of the second quantization matrix can only be 2×2, 4×4, or 8×8.

4. An encoding method comprising:
quantizing transform coefficients in a block in an image, using a first quantization matrix; and
encoding the first quantization matrix, wherein
(a) in a case where a first mode is used to encode the first quantization matrix, the encoding encodes, into a scaling list data syntax structure, information indicating that the first quantization matrix is the same as a second quantization matrix to be referenced, and encodes, into the scaling list data syntax structure, information for specifying the second quantization matrix,
(b) in a case where a second mode is used to encode the first quantization matrix, the encoding encodes, into the scaling list data syntax structure, the information for specifying the second quantization matrix, and encodes, into the scaling list data syntax structure, information for deriving a difference between an element of the first quantization matrix and an element of the second quantization matrix, and
(c) in a case where a third mode is used to encode the first quantization matrix, the encoding encodes a difference between an element and another element within the first quantization matrix,
wherein a code amount of information representing that the first mode is used is less than a code amount of information representing that the second mode is used,
wherein the code amount of information representing that the first mode is used is not greater than a code amount of information representing that the third mode is used, and
wherein a size of the second quantization matrix can only be 2×2, 4×4, or 8×8.

5. A decoding method comprising:
decoding a first quantization matrix; and
performing inverse quantization on residual coefficients, using the first quantization matrix,
wherein the decoding decodes, from a scaling list data syntax structure in a bitstream, first information representing a mode of decoding the first quantization matrix,
wherein (a) in a case where the first information decoded in the decoding represents that a first mode is used, the decoding decodes, from the scaling list data syntax structure, second information for specifying a second quantization matrix to be referenced and decodes the first quantization matrix by determining that the first quantization matrix is the same as the second quantization matrix specified based on the second information,
(b) in a case where the first information decoded in the decoding represents that a second mode is used, the decoding decodes, from the scaling list data syntax structure, the second information for specifying the second quantization matrix and decodes the first quantization matrix by using a difference between an element of the first quantization matrix and an element of the second quantization matrix specified based on the second information, and
(c) in a case where the first information decoded in the decoding represents that a third mode is used, the decoding decodes the first quantization matrix by using a difference between an element and another element within the first quantization matrix, wherein a code amount of the first information representing that the first mode is used is less than a code amount of the first information representing that the second mode is used, wherein the code amount of the first information representing that the first mode is used is not greater than a code amount of the first information representing that the third mode is used, and wherein a size of the second quantization matrix can only be 2×2, 4×4, or 8×8.

6. A non-transitory computer-readable storage medium storing a program which, when read and executed by a computer, causes the computer to executes the steps of an encoding method, the encoding method comprising:

quantizing transform coefficients in a block in an image, using a first quantization matrix; and encoding the first quantization matrix, wherein
(a) in a case where a first mode is used to encode the first quantization matrix, the encoding encodes, into a scaling list data syntax structure, information indicating that the first quantization matrix is the same as a second quantization matrix to be referenced, and encodes, into the scaling list data syntax structure, information for specifying the second quantization matrix,
(b) in a case where a second mode is used to encode the first quantization matrix, the encoding encodes, into the scaling list data syntax structure, the information for specifying the second quantization matrix, and encodes, into the scaling list data syntax structure, information for deriving a difference between an element of the first quantization matrix and an element of the second quantization matrix, and
(c) in a case where a third mode is used to encode the first quantization matrix, the encoding encodes a difference between an element and another element within the first quantization matrix, wherein a code amount of information representing that the first mode is used is less than a code amount of information representing that the second mode is used, wherein the code amount of information representing that the first mode is used is not greater than a code amount of information representing that the third mode is used, and wherein a size of the second quantization matrix can only be 2×2, 4×4, or 8×8.

7. A non-transitory computer-readable storage medium storing a program which, when read and executed by a computer, causes the computer to executes the steps of a decoding method, the decoding method comprising:

decoding a first quantization matrix; and performing inverse quantization on residual coefficients, using the first quantization matrix, wherein the decoding decodes, from a scaling list data syntax structure in a bitstream, first information representing a mode of decoding the first quantization matrix,
wherein (a) in a case where the first information decoded in the decoding represents that a first mode is used, the decoding decodes, from the scaling list data syntax structure, second information for specifying a second quantization matrix to be referenced and decodes the first quantization matrix by determining that the first quantization matrix is the same as the second quantization matrix specified based on the second information,
(b) in a case where the first information decoded in the decoding represents that a second mode is used, the decoding decodes, from the scaling list data syntax structure, the second information for specifying the second quantization matrix and decodes the first quantization matrix by using a difference between an element of the first quantization matrix and an element of the second quantization matrix specified based on the second information, and
(c) in a case where the first information decoded in the decoding represents that a third mode is used, the decoding decodes the first quantization matrix by using a difference between an element and another element within the first quantization matrix, wherein a code amount of the first information representing that the first mode is used is less than a code amount of the first information representing that the second mode is used, wherein the code amount of the first information representing that the first mode is used is not greater than a code amount of the first information representing that the third mode is used, and wherein a size of the second quantization matrix can only be 2×2, 4×4, or 8×8.

8. The image encoding apparatus according to claim 1, wherein the second quantization matrix is a quantization matrix which has already been encoded or a default quantization matrix all elements of which are 16.

9. The image encoding apparatus according to claim 1, wherein the encoding unit encodes a plurality of quantization matrixes including the first quantization matrix and the second quantization matrix, each one of the plurality of quantization matrixes is encoded using one of the first mode, the second mode, and the third mode, and the first information is encoded for each one of the plurality of quantization matrixes, wherein the encoding unit:

firstly encodes the first information for a quantization matrix having a size of 2×2;

encodes the first information for a quantization matrix having a size of 4×4 after the first information is encoded for each one of quantization matrixes having the size of 2×2; and encodes the first information for a quantization matrix having a size of 8×8 after the first information is encoded for each one of quantization matrixes having the size of 4×4.

10. The image decoding apparatus according to claim 3, wherein the second quantization matrix is a quantization matrix which has already been decoded or a default quantization matrix all elements of which are 16.

11. The image decoding apparatus according to claim 3, wherein the decoding unit decodes a plurality of quantization matrixes including the first quantization matrix and the second quantization matrix, each one of the plurality of quantization matrixes is decoded using one of the first mode, the second mode, and the third mode, the first information is decoded for each one of the plurality of quantization matrixes, wherein the decoding unit:

firstly decodes the first information for a quantization matrix having a size of 2×2;

decodes the first information for a quantization matrix having a size of 4×4 after the first information is decoded for each one of quantization matrixes having the size of 2×2; and decodes the first information for a quantization matrix having a size of 8×8 after the first information is decoded for each one of quantization matrixes having the size of 4×4.

* * * * *